US012346301B2

(12) United States Patent
Palm

(10) Patent No.: US 12,346,301 B2
(45) Date of Patent: Jul. 1, 2025

(54) LIST-BASED DATA SEARCH COMPRISING AN APPEND-ONLY DATA STRUCTURE

(71) Applicant: Cortex Innovations Gmbh, Bendeleben (DE)

(72) Inventor: Peter Palm, Isernhagen (DE)

(73) Assignee: Cortex Innovations Gmbh, Kyffhäuserland OT Bendeleben (DE)

( * ) Notice: Subject to any disclaimer, the term of this patent is extended or adjusted under 35 U.S.C. 154(b) by 0 days.

(21) Appl. No.: 18/555,804

(22) PCT Filed: Apr. 22, 2022

(86) PCT No.: PCT/EP2022/060747
§ 371 (c)(1),
(2) Date: Oct. 17, 2023

(87) PCT Pub. No.: WO2022/223807
PCT Pub. Date: Oct. 27, 2022

(65) Prior Publication Data
US 2024/0320207 A1      Sep. 26, 2024

(30) Foreign Application Priority Data

Apr. 23, 2021   (EP) .................................... 21170144

(51) Int. Cl.
*G06F 16/22*     (2019.01)
*G06F 16/215*    (2019.01)
*G06F 16/245*    (2019.01)

(52) U.S. Cl.
CPC ........ *G06F 16/2282* (2019.01); *G06F 16/215* (2019.01); *G06F 16/245* (2019.01)

(58) Field of Classification Search
CPC .. G06F 16/2282; G06F 16/215; G06F 16/245; G06F 16/219
(Continued)

(56) References Cited

U.S. PATENT DOCUMENTS 9,189,506 B2    11/2015  Gao et al.
9,547,659 B1 *   1/2017  Barber .................. G06F 16/215
(Continued)

OTHER PUBLICATIONS

Partial European Search Report for European Patent Application No. 21170144.6 mailed Nov. 15, 2021.
(Continued)

*Primary Examiner* — Phong H Nguyen
(74) *Attorney, Agent, or Firm* — Harness, Dickey & Pierce, P.L.C.

(57) ABSTRACT

A computer-implemented method for performing a database query within a database, that contains logical data records which are physically stored in the form of field-specific data value lists, includes receiving instructions to change data values; storing the instructions in an append-only data structure without making the changes to the field-specific data value lists, wherein each entry in the append-only data structure-referred to here as an AOD entry-contains at least those of the field identifier-data value pairs of one of the data records that are to be changed according to one of the change instructions; for each of the data records for which the database receives instructions, storing the address of the most recent of the stored AOD entries specifying a change to that data record, linked to the data record ID of that data record, in an address allocation table; and performing a database query.

20 Claims, 10 Drawing Sheets

(58) Field of Classification Search
USPC .......................................... 707/692, 741, 769
See application file for complete search history.

(56) References Cited

U.S. PATENT DOCUMENTS

| | | | |
|---|---|---|---|
| 2013/0275656 A1* | 10/2013 | Talagala | G06F 12/0246 |
| | | | 711/103 |
| 2017/0132429 A1* | 5/2017 | Bell | H04L 9/0891 |
| 2019/0102087 A1* | 4/2019 | Shi | H04L 67/1097 |
| 2021/0105142 A1* | 4/2021 | Lee | H04L 9/3247 |

OTHER PUBLICATIONS

Extended European Search Report for European Patent Application No. 21170144.6 mailed Feb. 11, 2022.
International Search Report for International Application No. PCT/EP2022/060747 mailed Jan. 17, 2023.
Yingjun Wu et al: "An empirical evaluation of in-memory multi-version concurrency control", Proceedings of the VLDB Endowment; [ACM Digital Library], Assoc. of Computing Machinery, New York, NY, vol. 10, No. 7, Mar. 2017 (Mar. 2017), pp. 781-792, XP058327797.
Barsky Marina et al: "Online update of B-trees", CIKM'10, Proceedings of the 19th International Conference On Information & Knowledge Management and Co-Located Workshops : Oct. 26-30, 2010, Toronto, Ontario, Canada, ACM, New York, NY, Oct. 26, 2010 (Oct. 26, 2010), pp. 149-158, XP058598359.
Goetz Graefe: "B-tree indexes for high update rates" , Sigmod Record. , vol. 35, No. 1, Mar. 2006 (Mar. 2006), pp. 39-44, XP055249332.
Arnoldreinhold et al: "Append-only", Wikipedia, Apr. 13, 2021 (Apr. 13, 2021), pp. 1-3, XP055885099, Retrieved from the Internet: URL:https://en.wikipedia.org/w/index.php?title=Append-only&oldid=1017496004 [retrieved on Jan. 28, 2022].
Avdlcz et al: "Blockchain", Wikipedia, Apr. 22, 2021 (Apr. 22, 2021), pp. 1-27, XP055885103, Retrieved from the Internet: URL:https://en.wikipedia.org/w/index.php?title=Blockchain&oldid=1019311207 [retrieved on Jan. 28, 2022].

* cited by examiner

Product datasheets for engines (JSON)

| | | |
|---|---|---|
| Product datasheet: | Engine CL 28378-RS-A123 | 302 |
| Type: | Three-phase engine | |
| Power: | 4 kW | |
| Torque: | (Nm) 0.43/0.42 | |
| Speed: | (1/min) 1340/1608 | |
| Manufacturer: | Gelb AG | |
| Place of manufacture: | Produktionsstraße 3, 16321 Bernau | |
| Colour: | silver | |
| Paint finish | shiny | |
| Installable in: | MF-3000, MF-3020, MF-3100, MF-6000 | |

304  306

Product data table Paints (.xsl)

| # | Paint ID | Paint type | Colour | Instructions |
|---|---|---|---|---|
| [...] | [...] | [...] | [...] | [...] |
| 308 | L-467-HT7 | Gloss paint | Red | The surface must be cleaned ... |
| 310 | L-467-HT8 | Gloss paint | Silver | The surface must be cleaned ... |
| 312 | L-467-HT9 | Matt paint | Yellow | The surface must be cleaned ... |
| 313 | L-467-HT23 | Matt paint | Silver | The surface must be cleaned ... |
| [...] | [...] | [...] | [...] | [...] |

Message text (.txt)

Gelb-AG made a profit of € 30 million in the 2005 financial year from the sale of engines. Trading in precious metals, especially gold and silver, generated a profit of € 4 million. The company was founded in 1978 by Paul Schmidt [...]

314  316  318

Trade register extracts (.txt)

| | | 320 |
|---|---|---|
| Company: | Gelb-AG | |
| Headquarters: | Kastanienallee 34, 56185 Wiesbaden | |
| Founded: | 02.12.1978 | |
| Director (first name, surname): | Martin Silber | |
| Founder: | Paul Schmidt | |
| Description: | Gelb-AG is a manufacturer of engines, transmissions and motor vehicle components. | |

Data memory 104

| Colour 402 | |
|---|---|
| Values | RIDs |
| Blue | 224, 278 |
| Yellow | 312 |
| Red | 308 |
| Silver | 302, 310 313 |
| [...] | [...] |

| Manufacturer 404 | |
|---|---|
| Values | RIDs |
| Gelb-AG | 302, |
| SAP-AG | 105, 923 |
| Sony-AG | 105, 222, 235, 299 |
| [...] | [...] |

| Paint IDs 406 | |
|---|---|
| Values | RIDs |
| L-467-HT7 | 308 |
| L-467-HT8 | 310 |
| [...] | [...] |

| Is-subordinate-to 414 | |
|---|---|
| Key RID | Superordinate RIDs |
| 243 | MF-6000 |
| 302 | MF-3000, MF-3020, MF-3100, MF-6000 |
| 304 | MF-3000, MF-3020, MF-6000 |
| [...] | [...] |

| Surname 408 | |
|---|---|
| Values | RIDs |
| Huber | 299 |
| Müller | 224 |
| Schmidt | 320, 287 |
| Silber | 320 |
| Stolze | 177, 299 |
| [...] | [...] |

| Metal types 412 | |
|---|---|
| Values | RIDs |
| Lead | 243 |
| Iron | 245, 256, 232 |
| Copper | 223, 56 |
| Silver | 278, 299, 256 |
| Zinc | 257, 278 |

| Is-superordinate-to 416 | |
|---|---|
| Key RID | Subordinate RIDs |
| MF-3000 | 302, 304, 267 |
| MF-3020 | 302, 304, 267 |
| MF-3100 | 302, 267 |
| MF-6000 | 302, 304, 243 |
| [...] | [...] |

Fig. 5

LIST-BASED DATA SEARCH COMPRISING AN APPEND-ONLY DATA STRUCTURE

CROSS-REFERENCE TO RELATED APPLICATIONS

This application is a national phase under 35 U.S.C. § 371 of PCT International Application No. PCT/EP2022/060747 which has an International filing date of Apr. 22, 2022 which claims priority to European Application No. 21170144.6 filed Apr. 23, 2021 the entire contents of each of which are hereby incorporated by reference.

FIELD

The invention relates to a method and system for storing data and performing efficient searches within the data.

PRIOR ART

In the prior art, various database management systems (DBMSs) for storing, managing and processing data are known. The main task of DBMSs is to store large amounts of data efficiently, without contradiction and permanently, and to make required subsets available to users and application programs in different, needs-based forms of representation. The basis for structuring the data and their relationships to each other in a database managed by a conventional DBMS is the database model, which is defined by the DBMS manufacturer. Depending on the database model, the database schema must be adapted to specific structuring options. The well-known database models used today include hierarchical models, network-like models, relational models (organised in tables), object-oriented models, document-oriented models as well as mixed forms of these models. In addition, a distinction is made typically between DBMSs that are optimised for efficiently answering many small queries (OLTPs) or long-lasting evaluations (OLAPs).

The main problem when dealing with big data is a resource problem. The larger the volume of data, the more resources are needed in the form of memory, processors and hard drives.

When creating a database and defining the queries and analyses to be performed on it, there is often a conflict of objectives between the complexity of the supported database search queries and the speed of the search. It is true that there are DBMSs that allow complex search queries taking into account temporal, content-based and/or structural search criteria. Often, these DBMSs have modules ("query planners") that automatically plan and orchestrate the temporal execution of complex, nested queries over multiple tables and the aggregation of the partial results obtained from multiple tables. However, these modules quickly reach their limits with very complex queries and/or with a large number of tables. The amount of data to be processed and loaded into the RAM may be immense in many "big data" applications and in practice may make it impossible to evaluate large data records of complex structure. At the very least, it is often not possible to perform all forms of data analysis that would be desirable for the task at hand. The areas that are particularly affected by the limitations of current DBMSs include, for example, the area of the Internet-of-Things (IOT), genome analyses, analyses of spectral data in the field of astronomy, movement data from taxi, bus and rail companies, airlines and mobile phone companies, but also many other areas.

By limiting the supported search queries to queries of lower complexity, both in terms of the search criteria and the results to be output, the speed of conventional database systems may often be increased to a limited extent. However, on the one hand this has the effect that important analyses are unable to be carried out on large data records and in many cases may even lead to an irreversible loss of data, as the raw data are mapped to a table structure of reduced complexity, with complex interrelations and metadata that are unable to be mapped in these table structures being lost.

Thus, existing DBMSs are often characterised by structural inflexibility, poor extensibility and/or poor performance, especially when processing complex queries relating to a large amount of data objects with a great many different attributes (keys) and corresponding values. If additional and differently structured data must subsequently be stored in the database, it is often not possible to query and analyse existing and newly added data together in a way that is expedient in terms of content and favourable in respect of performance and resources.

The challenge of big data to support complex analyses and data queries is still considered unsolved; it is a problem that will foreseeably grow larger in view of the further increase in data volume in the coming years.

SUMMARY

It is the object of the invention to provide an improved method and system for storing data and performing database queries in such a way that they do not have the above-mentioned problems or have them to a lesser extent.

The objects forming the basis of the invention are each achieved with the features of the independent claims. Embodiments of the invention are described in the dependent claims. The embodiments listed below may be freely combined with each other, provided they are not mutually exclusive.

In one aspect, the invention relates to a computer-implemented method for performing a database query within a database. The database contains a plurality of logical data records at a first time point, referred to as the "most recent consolidation time point". Each logical data record contains a data record ID and one or more field identifier-data value pairs. The data records are physically stored in the form of field-specific data value lists. The method comprises, after the most recent consolidation time point:

receiving instructions to change data values of fields of several of the data records;

storing the instructions in an append-only data structure without making the changes to the field-specific data value lists, wherein each entry in the append-only data structure-referred to here as an AOD entry-contains at least those of the field identifier data value pairs of one of the data records that are to be changed according to one of the change instructions;

for each of the data records for which the database receives one or more instructions to change data values after the most recent consolidation time point, storing the address of the most recent of the stored AOD entries specifying a change to that data record, linked to the data record ID of that data record, in an address allocation table, wherein the links in the address allocation are being automatically updated; and performing a database query, wherein the database query comprises:

i. searching the field-specific data value lists to identify IDs of data records of which the content is to be returned in whole or in part based on a match with one or more field-specific search values;

ii. accessing the address allocation table to identify addresses of AOD entries assigned to one of the data record IDs identified in i), iii. accessing the identified addresses of the AOD entries; and iv. using the change details contained in these identified AOD entries to add field identifier-data value pairs to the data record IDs ascertained in step i) and output the latter.

This may be advantageous for several reasons:

The database query is executed on two different data structures in such a way that even the most complex analysis queries may be carried out at high speed and complete result data records may be output quickly. Firstly, the database query in step i) is performed on the field-specific lists. This step is initially used only to identify IDs of data records of which the content is to be returned in whole or in part based on a match with one or more field-specific search values. Usually, the software or the user who initiated the database query needs not only the identifiers, but also the attributes (field-specific data values) that characterise a data record in terms of content in the first place. In the prior art, the database query is usually already formulated in such a way that it ascertains and returns the data records to be returned, including their attributes, in one process step. The database queries are also correspondingly complex, often extending over several tables and containing various JOIN operations. Due to the complexity of conventional database queries, several tables often have to be loaded and evaluated and the database queries have low performance or are impossible above a certain complexity. According to embodiments of the invention, however, the analysis of the physical carriers of the attributes of the data records, in this case the field-specific data value lists, serves only to ascertain data record IDs to be returned. It is not used to ascertain attributes of these result data records. According to embodiments of the invention, the field-related data values of the data records to be returned are not ascertained by analysing the field-specific data value lists, but by using two special data structures, namely the append-only data structure and the address allocation table.

The append-only data structure is a data structure consisting of several entries that are updated sequentially. A subsequent deletion or modification or regrouping of the individual AOD entries is not possible. Each AOD entry specifies a change of one or more data values of one or more fields of the logical data records.

This append-only data structure is functionally closely coupled to the address allocation table: namely, the address allocation table contains, for each of the logical data records, a row with the ID of that data record. The ID of this data record is stored in the address allocation table linked to exactly one address, wherein this one address is the address of the most recent AOD entry specifying a change to this data record.

In order to now provide the data records ascertained in step i) with current data values and output them, a software- and/or hardware-based data management and search system (DMS system) managing the database first accesses the address allocation table.

According to embodiments of the invention, the address allocation table contains, for each of the logical data records, exactly one entry (for example corresponding to exactly one row of the table) with the ID of that data record. The ID of each logical data record is stored in the address allocation table linked to exactly one address of an AOD entry, wherein this one address is the address of the most recent AOD entry specifying a change to that data record.

According to some embodiments of the invention, accessing the address allocation table to ascertain the entry in the address allocation table that relates to the ID of a particular logical data record (i.e., for example, to the ID of the data record to be returned) is implemented as follows: The DMS system is configured to generate the IDs of the logical data records managed by the DMS system and stored in a distributed manner in the lists such that each data record ID explicitly or implicitly specifies the offset that the one entry ("row") associated with that data record has in the address allocation table. In particular, the data record IDs may be numerical values. An explicit specification of the offset of an entry in the address allocation table may be, for example, the specification of the memory address of the entry in the address allocation table relative to a base address of the address allocation table. An implicit specification may be, for example, the specification of the number of that entry ("row number") in the address allocation table, wherein a multiplication of that entry number by the predefined memory size of each entry of the address allocation table gives the total offset of that entry relative to the base address of the address allocation table.

For example, the DMS system is configured to generate the address allocation table such that the position of the entries (rows) within the address allocation table are invariant and the offset of these entries is identical to the ID of the logical data record associated with that entry. The DMS system may be appropriately configured, when accessing the address allocation table, to ascertain the one entry for a particular logical data record, to calculate the position of that entry on the basis of the logical data record ID, for example by multiplying the data record ID as the offset of the entry by a specified memory location size of each entry in the address allocation table. The product thus obtained indicates the position of the entry in the address allocation table of that one data record starting from a base address of the address allocation table.

For example, when a new logical data record is generated, the DMS system is configured to generate the ID and also to generate a new entry/a new row in the address allocation table such that the offset of this new entry in the address allocation table is identical to the ID of the new logical data record. For example, a logical ID may be a numerical data value, or a memory address.

For example, the base address of the address allocation table could have the memory address #23862382844. Each row could require a predefined memory space of, for example, 16 bytes. Then, the DMS system could calculate the memory address of the entry for the logical data record with, for example, the ID 1008 as follows: base address+ (memory size of an address allocation table entry×ID of the logical data record)=#23862382844+16 byte×1008. The calculated memory address is fictitiously referred to here as #23862992849.

According to another, explicit implementation variant, the logical ID of the data record would be identical to the memory address of the corresponding entry in the address allocation table, that is to say for example #23862992849 instead of "1008" in the above-mentioned example.

Thus, according to embodiments of the invention, the management of the logical data records and the management of the entries in the address allocation table by the DMS system are closely coupled such that the logical data records are always generated and synchronised with the address allocation table such that the ID of each logical data record explicitly or implicitly specifies the memory address of the one entry in the address allocation table in which the ID of that logical data record is assigned the address of the AOD entry with the most recent changes to that data record. According to embodiments, when processing database queries, the logical ID of the data records to be returned is used to ascertain the address of the one entry in the address allocation table associated with that data record and to access that address directly.

This method of ascertaining the row in the address allocation table that contains the ID of the data record to be output requires little RAM and little CPU power, because the DMS system may access the corresponding entry in the address allocation table immediately and directly or, if necessary, after a simple and very quickly executable multiplication. It is not necessary to search the address allocation table. Starting from this entry in the address allocation table, the DMS system may directly access the relevant entry in the AOD data structure, because the address of this AOD entry with the most recent changes is specified in the previously ascertained entry of the address allocation table. If there are further AOD entries that specify further, older changes to this data record, these may also be ascertained and read very quickly by direct memory access, because preferably each AOD entry contains the address of the most recent AOD entry (at least if the AOD entry is not a "completely loaded" entry, i.e. does not contain all current field values of the respective data record.

The DMS system therefore only jumps from address to address to output data records as the result of any kind of database query and does not have to perform complex JOINS or SELECTS across several tables. This may result in an immense acceleration of even the most complex database queries, because once the IDs of the data records have been ascertained-which may be done very quickly on the basis of redundancy-free lists-the output of the complete data records runs substantially or exclusively on the basis of jump addresses, i.e. without sequential searches in data structures and/or complex JOIN operations of tables.

For example, this AOD entry may contain all current data values of all fields of said data record, so that with the access to this one AOD element, all current data values of this data record may already be ascertained and returned.

It is also possible that the AOD entry contains only current data values of one or more, but not all, of the data values of all fields of that data record (also referred to herein as an "incomplete AOD entry"). However, according to embodiments of the invention, "incomplete" AOD entries include an address that points to the next-older AOD entry that refers to the same data record. This address, also called a jump address, allows the DMS system to "jump" directly from AOD entry to AOD entry in the AOD file via the respective addresses specified in the AOD entries, in order to thus reconstruct all changes affecting that particular data record. This may be done until a current data value has been ascertained for all fields of the data record.

Thus, according to embodiments of the invention, starting from the data record IDs ascertained in step i), the field values of these data records may be ascertained highly efficiently and quickly, requiring only a fraction of the CPU and/or RAM resources required by conventional DBMSs for ascertaining and outputting complex result data records, because starting from the data record IDs from step i), only ID-based hits in the address allocation table need to be ascertained and, starting from these, one or more memory addresses of one or more AOD entries need specifically to be read out. This is very efficient because, for example, no linear scan of the append-only data structure is required, and instead a read access may be made directly to the AOD entry designated by the address.

According to embodiments of the invention, the field-specific data value lists are redundancy-free, sorted, field-specific data value lists in which each data value occurs only once per list.

According to embodiments, the database query is performed by a data processing and search system—DMS system—which manages the logical data records and persists them in the form of the field-specific data value lists. Besides the field-specific data value lists, the DMS system does not contain any further data structures from which all logical data records already managed by the DMS system at the first consolidation time point may be reconstructed. Although it is possible for the DMS system to temporarily parse or import raw data to read in the data records, this only serves for extraction of the data records. The data records are therefore not additionally stored permanently (persisted) in tables or other data structures.

This may be advantageous because very large amounts of data may be stored in such a way that only very little storage space is needed. In conventional databases, the data are first stored in data structures that primarily or exclusively serve to persist the data, that is to say for example in tables or in the nodes of graph databases. In addition to these structures—depending on the type and configuration of the DBMS used—additional structures such as search indices are then created to enable fast searching. The data are thus stored in a redundant manner both in the tables and in the indices. However, according to embodiments, the logical data records are stored only in the form of entries in the field-specific data value lists. The additional data structures described herein, such as AOD structure, positive list and/or negative list, are used in particular to store change information that is integrated into the existing or into a copy of the existing field-specific data value lists during the next consolidation. According to embodiments of the invention, the field-related lists thus serve both to permanently store the logical data records and to enable a quick search.

It has been observed that, as a rule, this type of logical data record storage not only avoids the storage of additional data in the form of additional search indices, but in fact compression usually takes place in the course of storage of raw data: For example, a CSV file that is 1.5 TB in size with multiple columns containing astronomical measurements and parameters in the form of integers, floating-point numbers and strings was stored in the form of field-specific data value lists of size 1.3 TB. The data compression is made possible by the fact that each field-specific data value only occurs once in the list. The storage of the references to the logical data records in which a data value occurs also costs storage space. Since the references are stored in the form of data record IDs, which may be stored in a space-saving manner, for example as numerical values of predefined length, the additional memory requirement needed for storing the data record IDs is usually less than the memory requirement saved by storing all data values belonging to a specific field/parameter only once. According to embodiments, further savings may be achieved by determining the number and minimum required memory size of the entries of the consolidated version of each of the field-specific data value lists in the course of the consolidation and selecting the structure of the consolidated data value lists and/or their storage location depending on the results of this determination.

The database has 1.85 billion data records with 98 fields

The data structures used in accordance with embodiments also allow for extremely performant data querying. For example, the 1.3 TB dataset mentioned above contained 1.85 billion logical data records with 98 fields. On the basis of the data structures according to embodiments of the invention, even very complex queries concerning a large number of fields may be performed within milliseconds, in some cases within a few seconds, on a standard computer (516 GB RAM, 2 Intel Xeon CPUs E5-2643 v4@3.40GHZ).

Each data value in each of the field-specific data value lists is assigned the data record ID of all logical data records that, according to their field identifier-data value pairs, contain that data value for the field represented by the list. Each of the data records is physically stored in the one or more field-specific data value lists in a distributed manner (wherein an identical data record ID(s) assigned to the data values of multiple lists combines the multiple data values into a conceptually coherent data record). Searching the field-specific data value lists in step i) is performed by matching field-specific search terms with the sorted data values of those field-specific data value lists of which the represented fields are identical to the fields of the field-specific search terms.

According to embodiments, the field-specific data value lists are free of locks ("database-locks") on any or all of the field-specific data value lists searched in step i) and free of locks on the data values contained therein, at least during the execution of step i). This may significantly accelerate the database query speed.

According to one embodiment, the address of an AOD entry may, for example, consist of a physical address of the first AOD entry of the append-only data structure in combination with an offset, wherein the offset is the address of the AOD entry relative to the first AOD entry of the append-only data structure.

In conventional DBMSs, no distinction was made between the ascertainment of the data record IDs of the set of data records to be returned and the attributes of these data records that were also to be returned. Rather, a single complex, usually SQL-based query specified which tables were to be analysed and which columns of those tables were to be evaluated and/or returned. However, embodiments of the invention allow the database queries to be two-step queries, wherein only the ascertainment of the IDs of the data records to be returned are performed on the physical carrier structures of the data, that is to say in this case the field-value-specific lists. The enrichment of the data records to be returned with their attributes is based on two special data structures, namely on the described address allocation table and the entries of the append-only data structure, to the address of which the entries of the address allocation table refers.

In another advantageous aspect, the database may also be used and consolidated very efficiently. Since the requested changes are not immediately stored in the field-specific lists between the first and a later ("second") point in time, but are initially only stored in the append-only data structure in the form of AOD entries (and according to some embodiments also in so-called positive lists and negative lists), read requests may still be executed without any "locks" on the field-specific lists. The field-specific lists thus represent a static, i.e., unchanging state during the first and second time points. Read requests may be executed very efficiently on these field-specific lists, as the lists do not need to be temporarily locked before some read accesses to ensure the consistency of the queries.

For example, the DMS system may be configured to allow only one writing process and a large number of reading processes running in parallel on the AOD data structure. It is therefore possible, without introducing locks for data consistency reasons, to evaluate the content of the continuously supplemented AOD data structure from many reading processes in order to complete various database queries. Logical conflicts do not exist here, since it is in the nature of the append-only structure that the one writing process required to supplement the data structure and several reading processes do not interfere with each other and, in particular, it is impossible for two writing processes to access the same memory simultaneously. According to embodiments of the invention, the method further comprises consolidating the changes instructed since the most recent consolidation time point by consolidating the field-specific data value lists independently of and/or in parallel with the execution of database queries on the field-specific data value lists. The consolidation is performed at a second time point, referred to as a new consolidation time point.

For example, a consolidation of the field-specific database lists may comprise an updating of the data values and data record IDs of the field-specific database lists using information (relating to field-related data values and their association with logical data records) stored on the basis of the positive and/or negative lists used in accordance with embodiments.

According to embodiments, the method further comprises, for each data value of each of the field-specific data value lists:

storing, in a list referred to as the negative list and data record IDs, the data record IDs of all logical data records that are no longer to be assigned that data value in respect of that field as a result of a change instruction received between the first and second consolidation time points; and storing, in a list referred to as a positive list (218) and data record IDs, the data record IDs of all logical data records that are to be assigned that data value in respect of that field as a result of a change instruction received between the first and second consolidation time points.

Performing the consolidation comprises updating the data values and data record IDs of the field-specific data value lists or copies of the field-specific data value lists according to the content of the positive lists and negative lists. After consolidation, the positive lists and negative lists are emptied.

According to embodiments, the method comprises performing further database queries on the field-specific data value lists in parallel with and independently of the consolidation, without interruption. Additionally or alternatively, the field-specific data value lists are also free of locks on the data values contained in them during the execution of the consolidation.

The consolidation described may be advantageous because storing the field-specific data values of the data records in field-specific data value lists ensures that only a few, and possibly no, list elements need to be temporarily locked from access during consolidation in order to avoid inconsistent query results. If, for example, a completely new data value relating to a field is added in the course of consolidating the data value lists, that is to say, for example, a previously unknown first name "Torben" is stored in the data value list specific to the field "first name" linked to the ID of the data record containing this value, the list contains only one new entry and the previous entries do not have to be locked. If an existing data value of a data record is changed, that is to say, for example, the typo-containing first name "Micchael" is corrected to "Michael" in a specific data record, the entry of the data value "Michael" does not change the data value itself, and instead only data record IDs assigned to this data value are supplemented by the ID of the now corrected data record. The data values of the first name list may therefore still be analysed and processed during this consolidation.

With conventional DBMSs, insofar as they support consolidation of a database with cached changes at all, it is often necessary to completely lock several columns or even tables during consolidation in order to ensure the logical consistency of the query results due to the complex table structure with multiple dependencies and logical constraints. For example, in the course of write and consolidation processes of conventional DBMSs, locks based on the semaphore mechanism are often used, which may significantly reduce the performance of the system with respect to the processing of database queries. According to embodiments of the invention, this is not necessary because, on the one hand, the field-specific list structure in combination with the address allocation table and the append-only data structure make complex table structures and constraints unnecessary in the database design, and because, on the other hand, in the case of many content-related changes, it is not the data values that are affected, but only the type and number of data record IDs assigned to these data values in the respective field-specific data value lists. The constraints may be, for example, conditions that must be met by the value of a variable in order for the value to be accepted into the table. According to embodiments of the invention, moreover, changes are initially not made at all in the field-related data value lists, but in the AOD data structure, positive lists and negative lists, so that the data value lists may be used without restriction for processing database queries. Only in the course of consolidation must the data value lists or copies of them be accessed in a write process, but in most cases existing data values are not affected by the changes at all, but at most the data record IDs stored linked to the data values. Only if, after a deletion, a data value is no longer assigned to said field in any of the logical data records, according to embodiments, is the corresponding data value of that data value list deleted (but it is also possible to leave the data value in the data value lists even if it no longer has an occurrence in the logical data records, as it may be that the data value is linked at a later time to data records to be stored in the future).

Alternatively, the method further comprises consolidating the changes instructed since the most recent consolidation time point by generating consolidated copies of the field-specific data value lists independently of and/or in parallel with the execution of database queries on the field-specific data value lists. The consolidation is performed at a second time point, referred to as a new consolidation time point.

The advantages of this embodiment correspond to the advantages of the embodiment in which the consolidation is performed directly on the data value lists already analysed for the database query, wherein the advantages go even further, as locking of data values or data record ID assignments may be completely avoided, since the consolidation is performed on copies of the field-specific data value lists and not on the field-specific data value lists used for current search queries.

For example, the creation of the consolidated copies of the field-specific database lists may be performed automatically by the DMS system in the course of the consolidations, especially in the background, while parallel database queries are executed by the DMS system in normal operation on the not yet consolidated data value lists using the AOD data structure and preferably also using the positive and negative lists. The DMS system is configured to execute database queries on the consolidated copies of the field-specific data value lists instead of the non-consolidated field-specific data value lists after the consolidation is completed. This "switchover" therefore causes new queries to be executed on the consolidated data value lists from the time of the completed consolidation or switchover.

The AOD data structure, the positive lists and the negative lists thus allow database queries to be carried out that return current results even though the field-specific data value lists may no longer be current in themselves, while consolidation processes are carried out in the background on copies of these data value lists. This enables a performant and uninterrupted availability of the data for database queries during the consolidation that takes place in the background.

According to embodiments of the invention, the consolidation comprises, for each of the field-specific data value lists:

analysing field-specific and data-value-specific positive lists and negative lists of data record IDs to ascertain changes relating to the number of unique data values of a field and changes relating to the highest number of data record IDs linked to a data value of that field between the first and second consolidation time points;

ascertaining the number of unique data values contained in a consolidated version of the field-specific data value list as a function of the change in the number of unique data values ascertained in the analysis;

ascertaining a first memory requirement to store the highest number of data record IDs ascertained in the analysis that will be assigned to a data value in the consolidated version of the field-specific data value list and a second memory requirement to store the largest data value to be stored in the consolidated version of the field-specific data value list;

calculating the memory requirement required to store a consolidated version of the field-related data value list as a function of the ascertained number of unique data values in the list and the first and second memory requirements;

ascertaining a contiguous area on a physical data carrier that is at least as large as the calculated memory area;

generating the consolidated version of the field-related data value list integrating the changes stored in the positive lists and negative lists since the last consolidation time point; and storing the consolidated version of the field-related data value list in the ascertained contiguous area of the data carrier. In particular, the storage may be such that each entry of the data value list has the same size, for example is at least as large as the sum of the calculated first and second memory requirements.

For example, the non-consolidated version of the data value list "First name" may contain 312,234 different entries (first names). Based on the analysis of the AOD data structure, the DMS system determines that 3 of these first names have been globally deleted in the dataset (that is to say, the deletion of these 3 first names affects not only three individual data records that have now been deleted or have a different first name, but, as a result of the three deletions or changes, there is no longer provided a single logical data record that has one of these three first names). In return, several hundred new data records have been saved in the AOD structure, including data records for persons with two entirely new first names. In the course of consolidating the first name data value list, three first names must therefore be deleted from the list and two new first names added. The number of elements in the consolidated first name list increases by a net amount of one element to 312,235 different entries (first names). The DMS system may calculate the memory requirement required by the consolidated first name list, for example as the product of the number of entries (312,235) and the memory requirement for a single entry.

The consolidated data value list is preferably stored in such a way that the list is stored in a contiguous physical memory area that is at least as large as the product of the 312,235 entries and the memory capacity required per entry of the data value list.

For example, the memory space required per entry of a data value list may be defined as follows: the memory area to be reserved for storing the data value itself corresponds to the space required by the largest or longest data value of this list. For example, the longest first name may be 20 characters (represented as a data type char with a memory requirement of 8 bits per char), resulting here in a memory area per first name value of 160 bits. However, each entry in the first name list also additionally includes a set of logical data record IDs, which may be represented as an integer data type, for example. The DMS system is configured to ascertain the maximum number of data record IDs assigned to a first name by analysing the not yet consolidated first name list and the AOD data structure. For example, some first names such as "Andreas" occur frequently and thus have a large amount of data record IDs, while other first names such as "X Æ A-12" are rare or unique. The most frequently occurring first name (taking into account the related changes stored in the AOD structure and/or the positive list and negative list of first names) determines the size of the memory area to be reserved for the amount of data record IDs per entry. For example, if the first name "Andreas" occurs most frequently, specifically for example in 502,344 logical data records, and if each data record ID is stored as a 32-bit integer, each entry of the first name data value list must reserve at least 502,344×32 bits=16,075,008 bits of memory for storing the data record IDs. Including the 160 bits for storing the first name data value, 16,075,168 bits of memory must therefore be reserved for each entry. Preferably, the largest frequency of occurrence observed for a data value of a field (set of assigned data record IDs) is stored linked to the respective data value list and newly ascertained and updated in the course of each consolidation.

In the example described here, the size of the contiguous physical memory area required to store the consolidated version of the first name list is calculated by taking the product of the 312,235 entries and the memory capacity of 16,075,168 bits required per entry of the data value list.

Thus, according to embodiments, the storage of the consolidated data value lists in the course of consolidation is done in such a way that each consolidated list is stored in a contiguous physical area of the data carrier and in data structures of predefined size (predefined size for the data value itself as well as for the set of data record IDs linked to it). Both the required memory requirement for the entire list and the required size for the data values and the amount of linked stored data record IDs are recalculated and adjusted, if necessary, for each consolidation. This may be advantageous because, on the one hand, the data may be read out particularly quickly if the data values of a list are physically stored consecutively next to each other and the read/write head does not have to make any jumps. On the other hand, the data are also stored in a very space-saving way because the memory areas reserved for the data values or the set of data record IDs adapt dynamically to the characteristics of the data actually present. The data structures used for storage therefore adapt automatically and flexibly to the data to be stored in such a way that only the memory area that is actually needed is reserved. In the context of databases, data values of variable size are often stored in separate data structures, which are then only referred to via a pointer. However, such storage may have a detrimental effect on performance. According to embodiments, each data value as well as its associated data record IDs is stored in a data structure of predefined size, wherein the individual data records are stored consecutively on the physical data carrier. According to some embodiments, the DMS system is configured to use a base address of the respective field-related data value list and an offset and memory size of an individual list entry to specify and access the physical memory address of each entry of the field-related data value lists. This may significantly reduce the access times. Direct, targeted access on the basis of an offset is made possible by using data structures of predefined size.

According to embodiments of the invention, the method comprises a provision of the field-specific data value lists, in particular an initial provision of the field-specific data value lists. The provision comprises:
    parsing raw data to create original data records, wherein each original data record comprises, in addition to a data record ID, one or more pairs of field identifiers and original data values assigned thereto;
    storing redundancy-free, field-specific original data value lists in the database, wherein each of the original data value lists in one of the redundancy-free original data value lists has assigned to it all the data record IDs of those data records containing that original data value in the one field represented by the original data value list;
    generating a mapping table that assigns to each of the original data values of the redundancy-free original data value lists at least one mapping ID that is not assigned to any other of the original data values;
    transforming the original data records into the plurality of logical data records and transforming the redundancy-free original data value lists into redundancy-free field-specific data value lists, wherein the transformation comprises replacing original data values with mapping IDs according to the mapping table, wherein the data values assigned to the field identifiers of the data records are the mapping IDs.

For example, the original data value may be a string, for example the first name "Michael", and the mapping ID assigned to this original data value may be a numerical value such as "3493487879".

According to other embodiments, the original data values may be used directly as the logical data values and the field-specific lists are in this case the field-specific original data value lists.

The use of mapping IDs instead of original data values when generating and storing the field-specific list, when performing the search and evaluating search values against field-specific data values has the advantage of significantly speeding up the method and minimising resource consumption: while the length of the original data values obtained for example in a parsing and/or tokenisation step is unpredictable and the storage of the original data values, present for example in the form of a string or varchar data type, requires a lot of memory space, the length of the mapping IDs may be fixed to a uniform value. In addition, the mapping ID may be stored as a numerical value, so that memory consumption may be reduced and the processing speed may be significantly increased compared to Unicode strings. In addition, the database is thus made more secure, because the data value lists now only consist of numerical mapping IDs, which do not allow reconstruction of the original data values without knowledge of the mapping table.

In the following, to explain the field-specific data values of the logical data values, examples are generally used in which the data values are original data values, for example Unicode strings. Preferably, however, the data values are numerical data values, in particular mapping IDs, which are uniquely assigned to an original data value in a mapping table. Depending on the embodiment, the mapping table may comprise several field-specific mapping tables or consist of a global mapping table that assigns a mapping ID to all data values present in any field.

According to embodiments of the invention, the mapping IDs are values of which the length and/or type are preferably selected depending on the processor architecture of the computer system used for the database search. In particular, the mapping IDs may be numerical values.

For example, all mapping IDs may have a specific bit length (for example 32 bits or 64 bits) that corresponds to the register length of the processor architecture used. This may further increase the speed of the data processing and reduce resource consumption.

According to embodiments of the invention, generating the mapping table comprises analysing the frequencies of occurrence of the original data values in the original data records. If the frequency of occurrence of an original data value in the original data records exceeds a threshold value, the method comprises assigning a plurality of different mapping IDs to this one original data value in the mapping table. Replacing the original data values in the transformation is done such that the one original data value is replaced by multiple mapping IDs, thereby obscuring the original frequency of occurrence of the one original data value.

This may have the advantage that an inference from the mapping IDs of the original data values based on the basis of the frequency of occurrence may be excluded. Depending on the language or data record, certain original data values, for example certain words, occur very frequently (in German, for example, words like "und", "ein", "eine" or "das" ("and", "a" or "the"), while others occur rarely (for example "Schiffschraube" ("ship's propeller")). Therefore, especially if the content of the database is approximately known, there is a certain risk that the original data records may be inferred from the field-specific lists even if these lists only contain mapping IDs and the mapping table is not known, since the frequency of occurrence of the data values or mapping IDs gives clues to the original data values. According to embodiments of the invention, this may be avoided by possibly assigning several different mapping IDs to the same data value so that the frequency of occurrence of the data value in the original data records is obscured. For example, the original data value "Michael" may have initially been assigned the mapping ID "9237923". When the number of original data records containing a particular data value (for example "Michael") in a particular field exceeds a threshold value (for example 1,000 or 10,000, etc. depending on the application), the occurrence of that data value in each subsequent data record is stored in the data value lists and the mapping table such that, from the next (for example $1,001^{st}$ or $10,001^{st}$) occurrence of this data value in the data records, a new mapping ID "23747283472" is assigned to the data value "Michael", and the field-specific data value list is also extended by this new data value together with the assigned data record IDs.

According to embodiments of the invention, at least one of the change instructions is an instruction to change or delete an obsolete data value of a field in at least one of the logical data records. The method comprises storing the data record ID of the at least one data record in a list of data record IDs referred to as a negative list. The negative list is stored in a data structure linked to the field identifier of the one field and linked to the data value to be changed or deleted according to the change request.

The execution of the database query comprises, for each of the field-specific search values:
  checking whether the data structure contains a negative list stored linked to a data value and a field identifier that are identical to the field-specific search value and the field identifier of the search value;
  if so, calculating a difference amount of all data record IDs ascertained in step i) for this field-specific search value and the data record IDs in the negative list; and
  using the difference amount of data record IDs for steps ii-iv.

This may be advantageous as it ensures that data records that should no longer be found in the database query due to changes in one or more data values since the most recent consolidation time point, but are initially found in step i) because the data value lists do not yet reflect the changes, are not returned. For example, for each of the field-specific data value lists, a data structure may be created in the database that contains, for each data value contained in this data value list, a list of those data record IDs in a data-value-specific "negative list" for which this value was deleted in the field representing the data value list, whether by overwriting the data value or by deleting the data value or by deleting the entire data record. This ensures that the database query also takes into account deletions of data values of specific fields that have not yet been consolidated.

According to embodiments of the invention, at least one of the change instructions is an instruction to assign a new data value to a field in at least one of the data records. The method further comprises:
  storing the data record ID of the at least one data record in a list of data record IDs referred to as a positive list, wherein the positive list is stored in a data structure linked to the field identifier of the one field and linked to the new data value;
  if the new data value replaces an obsolete data value, storing the data record ID of the at least one data record in a list of data record IDs referred to as a negative list, wherein the negative list is stored linked to the field identifier of the one field and linked to the obsolete data value.

The execution of the database query comprises, for each of the field-specific search values:
  checking whether the data structure contains a positive list stored linked to a data value and a field identifier that are identical to the field-specific search value and the field identifier of the search value;
  if so, calculating a union set of all data record IDs ascertained in step i) for this field-specific search value and the data record IDs in the positive list; wherein if the new data value replaces an obsolete data value, the data record IDs of the union set are reduced by the data record IDs in the negative list assigned to this search value and its field, and using the union set of data record IDs for steps ii-iv.

This may be advantageous as it ensures that data records that should be additionally found in the database query due to changes in one or more data values since the most recent consolidation time point, but are not yet initially found in step i) because the data value lists do not yet reflect the changes, are returned. For example, for each of the field-specific data value lists, a data structure may be created in the database that contains, for each data value contained in this data value list, a list of those data record IDs in a data-value-specific "positive list" for which this value was stored in the field representing the data value list, whether by overwriting another, obsolete data value or by storing the data value for the first time in the field of this data record or by storing the entire data record for the first time. This ensures that the database query also takes into account not yet consolidated changes and supplementations of data values of specific fields or newly written data records.

According to embodiments of the invention, the data structure contains a searchable, sorted array of elements. The array is a list of list elements or a search tree of nodes. In particular, the search tree may be a B-tree. The array represents one of the fields in each case. The elements of the array represent one data value each from a non-redundant list of data values contained in the data records and assigned to the field represented by the array. Each of the elements of the array is stored linked to an empty or non-empty positive list and/or an empty or non-empty negative list.

The implementation of the positive lists and/or negative lists in sorted, searchable form may be advantageous, as this also allows dynamically changed and not yet consolidated data to be taken into account very quickly in the database query.

Until now, conventional databases did not allow for efficient querying of dynamic, non-consolidated data that had not yet been transferred into the (table) form actually intended for storage, because several problems arose here at the same time: new data not yet consolidated, for example stored in a cache, are not captured by the queries working on the actual (table) structures used for data storage. In addition, they are available in a structure in the cache on which these queries could not work anyway. By contrast, the use of the positive and negative lists in combination with the other data structures described, in particular the field-specific data value lists, the append-only data structure and the address allocation table, has the advantage that set operations on data record IDs are quite sufficient to recognise the set of data records ultimately to be output in response to the database query: both step i) and the search in the negative lists and/or positive lists ultimately return data record IDs that may be processed in a highly efficient way by set operations on these data record IDs.

For example, a search query may include the search value "Michael" with respect to the field "First name". A search with the search value in the non-redundant data value list for the field "First name" results in step i) in an initial set of data record IDs concerning data records that had the value "Michael" in the field "First name" at the most recent consolidation time point.

An evaluation of the negative list of the data value "Michael" for the field "First name" results in a second set of data record IDs concerning data records in which the first name "Michael" has been deleted since the most recent consolidation time point, for example due to overwriting or because the entire data record was deleted. However, since the first set ascertained in i) does not contain any changes since the most recent consolidation time point, the IDs of the second set must be subtracted from the IDs of the first set, i.e. a difference set must be formed to prevent data records from being output that in the meantime no longer contain the search value "Michael" in the first name field.

An evaluation of the positive list of the data value "Michael" for the field "First name" results in a third set of data record IDs concerning data records in which the first name "Michael" has been added since the most recent consolidation time point, for example due to overwriting an obsolete value or because the entire data record was newly created. However, since the first set ascertained in i) does not contain any changes since the most recent consolidation time point, the IDs of the third set must be added to the IDs of the first set, i.e. a union set must be formed from sets one and three to ensure that data records are also output that contain the search value "Michael" in the first name field only after the most recent consolidation time point.

Thus, the use of positive lists and/or negative lists makes it possible to ascertain very quickly second and/or third sets of data record IDs that may be aggregated by set operation with the set of data record IDs ascertained in step i) in order to ascertain the set of data records to be ultimately returned. Here too, the enrichment of the data records to be output with attributes (data values) is done via the address allocation table and the append-only data structure. Since jump addresses to AOD entries may be used when supplementing the data record IDs to be output, no complex, cross-table JOINs or similar complex operations are required, and therefore the output is very efficient.

According to embodiments, the DMS may perform database queries only on the already consolidated data and/or on all available data including the dynamic, i.e. not yet consolidated, data. In no case is there a risk of inconsistent data or time delays due to locks.

The DMS system may perform the database query exclusively on the data consolidated at the most recent consolidation time point, for example by using only the data value lists and not the positive lists or negative lists to ascertain the data record IDs in step i) and by evaluating only AOD entries to complete the data records ascertained in i) and to be returned, which were ascertained via the address allocation table for these data record IDs and which are older than the most recent consolidation time point.

Additionally or alternatively, the DMS system may perform the database query on the totality of the available data, i.e. on the consolidated and the not-yet-consolidated data, for example by using the data value lists and additionally the positive lists and negative lists to ascertain the data record IDs in step i) and by evaluating all AOD entries to complete the data records ascertained in i) and to be returned, which were ascertained via the address allocation table for these data record IDs.

If the data values are mapping IDs, according to embodiments the data values are replaced with the original data values assigned to the mapping IDs in the mapping table before output.

According to embodiments of the invention, the elements of the array each represent a data value which is a numerical value and is referred to as a mapping ID. The mapping ID is assigned to exactly one original data value obtained from raw data in a mapping table. The numerical values of the mapping IDs in the mapping table are preferably selected such that the numerical order of the mapping IDs is identical to an order relation of the original data values. The order relation of the original data values is in particular an alphabetical, numerical or otherwise defined order. The sorting of the elements in the searchable array corresponds to a search order based on the numerical order of the mapping IDs.

This may be advantageous because the evaluation of the negative lists and/or positive lists may be performed very efficiently. For example, with a B-tree, no sequential searching is required in the nodes of the tree, since the nodes in the tree are arranged according to an order relation. The use of sorted lists may be particularly advantageous when, in view of the small number of elements, the construction of a search tree would be too costly. According to embodiments of the invention, combinations of search trees and search lists may also be generated, wherein the question of whether an array is generated as a search tree or search list is dynamically generated depending on the number of data values to be searched, wherein a search tree is only generated if the number of data values to be searched exceeds a minimum number.

According to embodiments, the field-specific data value lists are each non-redundant data value lists selective of those data values assigned to the field representing that field-specific data value list in the logical data records. Each data value in the respective field-specific data value list is unique (hence "non-redundant" lists) and is stored linked to the data record IDs of all logical data records containing that data value in the field represented by the field-specific data value list.

The data values are preferably stored in sorted form in the field-specific data value lists. This may increase the search speed of database queries in these lists enormously.

Embodiments of the invention may have the advantage that data records described by a very large number (even thousands per object) of data values relating to many different fields (representing specific properties or semantic concepts) may be queried for any combination of the most diverse field-specific data values with very short query times, without having to comply with a specification that depends on the original structure of the data objects (as is the case, for example, with search queries in relational, index-based DBMSs with regard to the table and index structures in the database). In index-based systems, indices of all possible combinations of all keys would have to be available. The amount of indices in conventional index-based DBMSs therefore grows with the factorial of the keys! Particularly in the case of a large number of different object types with a large number of different semantic concepts, the number of required indices grows by any conceivable combination of key-related search criteria with the factorial of the keys! According to embodiments of the invention, on the other hand, the generation and use of an index (in the sense of a searchable data structure generated in addition to the actual data values) is not necessary, in particular not in the static part of the database. According to embodiments, a non-redundant data value list corresponds to each field, in which each data value of this field-in contrast to, for example, the data-record-based tables of a relational DBMS-occurs only once. Thus, according to embodiments of the invention, a search and/or analysis may be performed without having to generate suitable index structures for the expected search queries. Rather, the search may be performed directly in the redundancy-free field-specific data value lists.

According to embodiments of the invention, the consolidation comprises receiving a command to consolidate the changes instructed since the most recent consolidation time point. The command is received at a second time point. In response to receiving the command, the method comprises:
  implementing the changes in the field-specific data value lists instructed between the most recent consolidation time point and the second time point, or copies thereof, in order to generate the consolidated field-specific data value lists so that each data value in each of the consolidated field-specific data value lists is assigned only the IDs of those logical data records that contain that data value even after taking into account the changes in that field instructed between the first and second time points;
  using the consolidated field-specific data value lists instead of the previously used field-specific data value lists to perform database searches after the second time point;
  using the second time point as the new most recent consolidation time point.

For example, the field-specific data value lists may be consolidated by removing the data record IDs contained in the negative lists from the corresponding field-specific lists where they are still linked to the corresponding data value. Similarly, the consolidation may involve adding the data record IDs in the positive lists to the corresponding field-specific lists so that the IDs of these data records are now also linked to the corresponding data values.

According to embodiments, in response to receiving the command and after generating the consolidated field-specific data value lists, the method comprises regenerating the at least one data structure. The generation is based on the consolidated field-specific data value lists, wherein the re-generation of the data structure comprises an emptying of the positive lists and/or negative lists.

This may be advantageous because in the course of consolidation the content of the positive and negative lists is converted in the field-specific database lists, so that at the second point in time a new consolidated state of the data is created in the database. For the instructions to perform data value changes received after the second time point and thus after consolidation, the emptied positive lists and negative lists are filled again, and this continues until consolidation is performed again. This prevents the positive and negative lists from becoming too long, which would make their use and management (for example generating and updating B-tree) computationally more expensive.

According to embodiments of the invention, implementing the changes instructed between the most recent consolidation time point and the second consolidation time point comprises ascertaining the changes instructed between the most recent consolidation time point and the second consolidation time point by analysing the positive lists and negative lists of all data values in all field-specific data value lists affected by changes.

According to embodiments of the invention, at least some of the logical data records include one or more "is-subordinate-to" fields, wherein each "is-subordinate-to" field is configured to store a data record ID of a data record that is superordinate to that data record. This means that the DMS system is configured to store only data record IDs in "is-subordinate-to" fields of data records that actually satisfy said relation.

The field-specific data value lists comprise a data value list representing the "is-subordinate-to" field, wherein the data values stored in this data value list are IDs of logical data records that are subordinate to at least one other logical data record. Each of the data values in the "is-subordinate-to" data value list is assigned one or more IDs of the other, superordinate data records. The database query contains a completeness search parameter which specifies whether, in addition to the data records ascertained in the database query, the data records superordinate to these data records are also to be output.

The execution of the database query comprises:
determining that the superordinate data records are also to be output;
searching the "is-subordinate-to" data value list with the data record IDs ascertained in step i) in order to obtain one or more IDs of data records which are superordinate to the data records ascertained in step i);
accessing the address allocation table to identify addresses of AOD entries assigned to an ID of one of the ascertained superordinate data records; and
accessing these identified addresses of the AOD entries in order to add superordinate data records to the data records ascertained in the database query.

This may be advantageous because hierarchical object relationships may also be output, wherein the hierarchy is extended upwards by one or more levels, starting from the hits in step i) for the search value in the data record hierarchy. If a data record of which the ID is ascertained in step i) is subordinate to several other data records, for example because it is a vehicle that has several owners, the superordinate data records and their data values may be output at the same time without having to execute a complex and inefficient database query over several tables.

According to embodiments of the invention, at least some of the logical data records include one or more "is-superordinate-to" fields, wherein each of the "is-superordinate-to" fields is configured to store a data record ID of a data record that is subordinate to that data record.

The field-specific data value lists comprise a data value list representing the "is-superordinate-to" field. The data values stored in this data value list are IDs of logical data records that are superordinate to at least one other logical data record, wherein each of the data values in the "is-superordinate-to" data value list is assigned one or more IDs of the other, subordinate data records.

The database query contains a completeness search parameter which specifies whether, in addition to the data records ascertained in the database query, the data records subordinate to these data records are also to be output. The execution of the database query comprises:
determining that the subordinate data records are also to be output;
searching the "is-superordinate-to" data value list with the data record IDs ascertained in step i) in order to obtain one or more IDs of data records which are subordinate to the data records ascertained in step i);
accessing the address allocation table to identify addresses of AOD entries assigned to an ID of one of the ascertained subordinate data records,
accessing these identified addresses of the AOD entries in order to add subordinate data records to the data records ascertained in the database query.

This may be advantageous because hierarchical object relationships may also be output, wherein the hierarchy is extended downwards by one or more levels, starting from the hits in step i) for the search value in the data record hierarchy. If a data record of which the ID is ascertained in step i) is superordinate to several other data records, for example because the data record represents a person owning several vehicles, wherein the vehicles are represented as data records subordinate to the person, the subordinate data records and their data values may be output at the same time without having to execute a complex and inefficient database query over several tables.

Embodiments thus have the advantage that the results of a database query may be dynamically expanded in such a way that, in addition to the data records that are directly ascertained as results of the database query (in step i)), further data records may also be ascertained and output that are superordinate or subordinate to these initial result data records. An adjustment of the database query is not necessary here. This means that a database query that only returns the data records (enriched with data values) that were ascertained in step i) and a database query that also contains subordinate and/or superordinate data records (together with their data values) in addition also to the result data records may be performed with almost the same speed. For this purpose it is neither necessary to adapt the query and make it more complicated (and thus less performant), nor to predefine separate SQL SELECT queries for different query options (without supplementary data records, only supplemented with superordinate data records, only supplemented with subordinate data records, supplemented with subordinate and superordinate data records). Since the ascertainment of the superordinate and subordinate data records is ultimately based on data record IDs via set operations and the supplementation of these data record IDs with data values (attributes) is performed in a highly performant manner via the address allocation table and one or more AOD entries, the database according to embodiments is highly flexible, highly scalable and may execute even the most complex queries on very large data records with minimal CPU and memory requirement.

According to embodiments, the steps described above for supplementing the result data records initially ascertained in step i) with further subordinate and/or superordinate data records may also be executed iteratively, so that several levels of superordinate and subordinate data records may also be output. In this way, database queries of the highest complexity may be processed performantly, which would not be possible in conventional DBMSs, at least not within an acceptable runtime.

According to embodiments, the DMS system has an interface that allows a query system (for example a software, another computer system, a digital representation of a user, etc.) not only to specify a database query and have it executed, but also to specify whether the database query should ascertain and output, in addition to the actual result data records, also data records that are superordinate and/or subordinate to the actual result data records of this query. The query system may preferably specify individually for each individual query whether the query is to be executed as such an extended query, and the DMS system automatically checks whether superordinate or subordinate data records exist for a data record ascertained for the query in step i) by performing a search in the field-specific data value lists "is-superordinate-to" and/or "is-subordinate-to".

According to some embodiments, each AOD entry contains an identifier, also referred to as a "flag", that indicates whether a superordinate or subordinate data record exists for the data record to which the AOD entry relates. If this identifier indicates that no superordinate or subordinate data record exists, the step of searching the "is-superordinate-to" and/or "is-subordinate-to" data value lists is omitted even if the query is actually to be performed as an extended query, since in this case the identifier already indicates that no superordinate or subordinate data records exist for this data record. This may further increase the speed of the method.

According to embodiments of the invention, the field-specific data value lists comprise a plurality of field-specific data value lists referred to as time value lists.

Each of the time value lists consists of a non-redundant list of time points, wherein the time points each represent a time point at which the validity of a data value of the field to which that time value list relates begins or ends in one or more of the logical data records. Each of the time points in the time value list is assigned the IDs of the logical data records valid at that time point. For example, the field-specific data list for the "First name" field may contain a non-redundant list of all the first names of all the data records, and the time value list associated with that field may contain a non-redundant list of all the time points at which a data value of the First name field became valid in any of the data records (for example, by generation of a data record with a first name or by assignment of a currently valid first name to the First name field of an existing data record.

The method preferably further comprises:
  in response to receiving a change request relating to one of the logical data records (i.e. relating to the assignment of a new, more current data value to one of the fields of the data record), generating a new version of the data record to be changed, wherein the new version is a new logical data record containing at least one pre-version field, wherein the pre-version field contains the ID of the data record to be changed, wherein the new version, but not the data record to be changed, contains the changes specified in the change request and the time of change; and
  storing the new version of the data record with the new data record ID in the field-specific data value lists and storing the start of validity of the new data record of the time value list, and the field to which said change instruction refers, wherein the ID of the new version is stored in the time value list.

This may be advantageous because the historical course of the validity of a data record and the validity of its individual data values is also stored, so that the history of the data records over time is also stored and may be reconstructed. If a data value of a data record changes, i.e. the previous data value becomes invalid, the DMS system creates a new logical data record of which the start of its validity period begins with the start of the validity or assignment of the new data value, wherein the validity period of the data record ends when one of its data values becomes invalid, i.e. changes or is deleted.

According to embodiments of the invention, the database query includes an indication of a field-specific validity time. The validity time specifies the time point or time period at which the data record versions to be ascertained in the database query contained the at least one field-specific search value in the corresponding field. The execution of the database query comprises:
  identifying the time value list that relates to the field to which the search value and the validity time relate;
  searching the identified time value list with the validity time in order to identify one or more data record IDs of those data record versions stored in the time value list linked to the validity time or with a time point within the validity period;
  identifying the field-specific data value list that relates to the field to which the search value and the validity time relate;
  searching the identified data value list with the search value in order to identify one or more data record IDs stored in the data value list linked to the search value;
  calculating the intersection set of the IDs of the versions of the data records ascertained on the basis of the identified time value list and the identified data value list;
  accessing the address allocation table to identify addresses of AOD entries assigned to an ID of one of the data record versions ascertained in the previous step; and
  accessing the addresses of the AOD entries identified in the previous step in order to supplement the data record versions valid at the validity time point or during the validity time period by their field values and output them.

This may be advantageous because for each field value of the data records it may be determined when it was changed or during what time period the data value was valid for a specific field of a specific data record. Since the time values are stored as data values in redundancy-free data value lists, an efficient search for changes that occurred on, after or before a certain time point is also possible. The time information may, for example, consist of a combination of date and time information and/or may be stored as a numerical value that increases over time starting from a predefined global start time.

According to embodiments of the invention, the number and/or type of field identifiers is different for at least some of the data records.

This may be advantageous because it makes the database very flexible to use. It is possible to store a wide variety of data in the database without having to adapt the structure of the physical storage structures, in this case the field-specific data value lists. It is avoided that information is lost when storing raw data in the database because data is transformed into a narrow, predefined corset of table structures. Instead, data records with different fields may be stored equally in the database because ultimately the data values of each field are stored in a redundancy-free field-specific data value list.

According to some embodiments, a logical data record may also include multiple field identifier-data value pairs that refer to the same field. This may be particularly advantageous for fields representing relations. For example, a "is-superordinate-to" field may occur multiple times in a data record that characterises a person who owns multiple vehicles. A person-owns-vehicle relation may be represented and stored in the database by having the data record IDs of the data records representing vehicles owned by that person stored in the multiple "is-superordinate-to" fields of that person. By having multiple field identifier data value pairs for the same field in a data record, it is possible to store arbitrary relations between objects including 1:n and n:m relations such that these complex relations may be very quickly ascertained and output and/or considered by database queries.

According to embodiments of the invention, the AOD entries are stored as elements of a blockchain in the append-only data structure, which are chained together via a cryptographic hash value. The execution of the database search comprises a validity check of the hash values of those AOD entries that are processed in the course of the database query.

This may be advantageous since a subsequent manipulation of the append-only data structure may be effectively prevented, or at least it is possible to immediately detect such a manipulation by the DMS system validating the hash values of the blockchain before using the append-only data structure.

In another aspect, the invention relates to a volatile or non-volatile storage medium on which computer-readable instructions are stored. The instructions are configured to cause a processor to execute a method for performing a database query within a database in accordance with any of the embodiments and examples described herein.

In another aspect, the invention relates to a computer-implemented method for performing a database query within a database, and to a corresponding computer system, computer program product and data structures. The database contains a plurality of logical data records at a first time point, referred to as the "most recent consolidation time point". Each logical data record contains a data record ID and one or more field identifier-data value pairs. The data records are physically stored in the form of field-specific data value lists. The method comprises, after the most recent consolidation time point:

receiving instructions to change data values of fields of several of the data records;

storing the instructions in an append-only data structure without making the changes to the field-specific data value lists, wherein each entry in the append-only data structure— referred to here as an AOD entry— contains at least those of the field identifier data value pairs of one of the data records that are to be changed according to one of the change instructions;

for each of the data records for which the database receives one or more instructions to change data values after the most recent consolidation time point, storing the address of the most recent of the stored AOD entries specifying a change to that data record, linked to the data record ID of that data record, in an address allocation table, wherein the links in the address allocation are being automatically updated; and performing a database query on the field-specific data value lists using the address allocation table. For example, the database query may comprise steps i-iv described above which are described here for embodiments of the invention. All other embodiments may also be combined with this aspect of the invention. In another aspect, the invention relates to data structures. The data structures comprise:

multiple field-specific data value lists in which logical data records are stored in a distributed manner, wherein each data record contains a data record ID and one or more field identifier-data value pairs;

an append-only data structure, containing instructions for changing data values of the fields of the data records, wherein each entry in the append-only data structure-referred to here as an AOD entry, contains at least those of the field identifier data value pairs of one of the data records that are to be changed according to one of the change instructions;

an address allocation table, wherein the address allocation table assigns to the ID of each of the data records for which an AOD entry with change instructions is stored in the append-only data structure the address of the most recent AOD entry specifying a change to that data record.

Each of the field-specific data value lists, the append-only data structure and the address allocation table are each to be considered as one data structure.

According to embodiments of the invention, the data structures additionally or alternatively comprise at least one data structure containing a searchable, sorted array of elements. The array is a list of list elements or a search tree of nodes. In particular, the search tree may be a B-tree. The array represents one of the fields of the logical data records in each case. The elements of the array represent one data value each from a non-redundant list of data values contained in the data records and assigned to the field represented by the array. Each of the elements of the array is stored linked to an empty or non-empty positive list and/or an empty or non-empty negative list.

According to embodiments of the invention, the data structures additionally or alternatively comprise field-specific redundancy-free data value lists. The data value lists may be configured as field-specific original data value lists, obtained from raw data, in which original data records have been stored, or lists of values (referred to here as "mapping IDs") uniquely assigned to these original data values in a mapping table, and preferably numerical values.

According to embodiments of the invention, the data structures additionally or alternatively comprise a mapping table. The mapping table assigns to each of the original data values of the original data records at least one mapping ID that is not assigned to any other of the original data values. The mapping IDs are used as the data values of the logical data records and the field-specific lists.

According to embodiments of the invention, the data structures additionally or alternatively comprise one or more field-specific time value lists, wherein each time value list is a list consisting of a redundancy-free list of validity times, wherein each validity time indicates a time at which a data value of the field representing that time value list was changed in one of the logical data records, wherein each validity time in each field-specific time value list is assigned the data record IDs of all versions of the logical data records of which the data value corresponding to the field of the time value list was changed at that validity time.

According to embodiments of the invention, the data structures additionally or alternatively comprise one or more "is-superordinate-to" data value lists, wherein the data values stored in that "is-superordinate-to" data value list are IDs of logical data records superordinate to at least one other logical data record, wherein each of the data values in the "is-superordinate-to" data value list is assigned one or more IDs of the other, subordinate data records.

According to embodiments of the invention, the data structures additionally or alternatively comprise one or more "is-subordinate-to" data value lists, wherein the data values stored in that data value list are IDs of logical data records subordinate to at least one other logical data record, wherein each of the data values in the "is-subordinate-to" data value list is assigned one or more IDs of the other, superordinate data records.

In another aspect, the invention relates to a computer system comprising at least a processor and a data memory comprising a database.

The database contains, at a first time point, referred to as the "most recent consolidation time point", a plurality of logical data records, wherein each data record has a data record ID and one or more field identifier-data value pairs. Each data record contains a data record ID and one or more field identifier-data value pairs, wherein the data records are physically stored in the form of field-specific data value lists.

The computer system further comprises a data processing and search system—DMS system. The DMS system is configured to manage the database, wherein the management after the most recent consolidation time comprises:

receiving instructions to change data values of fields of several of the data records;

storing the instructions in an append-only data structure without making the changes to the field-specific data value lists, wherein each entry in the append-only data structure-referred to here as an AOD entry-contains at least those of the field identifier data value pairs of one of the data records that are to be changed according to one of the change instructions;

for each of the data records for which the database receives one or more instructions to change data values after the most recent consolidation time point, storing the address of the most recent of the stored AOD entries specifying a change to that data record, linked to the data record ID of that data record, in an address allocation table, wherein the links in the address allocation are being automatically updated; and performing a database query, wherein the database query comprises:
  i. searching the field-specific data value lists to identify IDs of data records (214) of which the content is to be returned in whole or in part based on a match with one or more field-specific search values;
  ii. accessing the address allocation table to identify addresses of AOD entries assigned to one of the data record IDs identified in i),
  iii. accessing the identified addresses of the AOD entries; and
  iv. using the change details contained in these identified AOD entries to add field identifier-data value pairs to the data record IDs ascertained in step i) and output the latter.

According to embodiments, the at least one processor comprises an ALU (Arithmetic Logic Unit processor) or an FPGA (Field Programmable Gate Array). The ALU or FPGA is configured to perform a set operation on sets of the data record IDs, wherein the set operation comprises in particular a calculation of an intersection set, a union set, a difference set or a symmetric difference set. In particular, the set operations may be performed by the ALU or the FPGA such that a comparison of two data record IDs is performed within a single operation cycle (comparison operation) of the ALU or the FPGA. For example, the length of the identifiers may correspond to the processing range of the processor architecture (for example 32 bits for 32 bit architectures, 64 bits for 64 bit architectures). If the processor architecture is able to process numerical values particularly efficiently, the identifiers may consist of numerical values. If the processor architecture is able to process other value types (for example symbols) particularly efficiently, the identifiers may consist of symbols.

This may be advantageous because an implementation in the form of hardware components of which the design (for example register size) is optimised to perform set operations on data record IDs of a predefined length may significantly speed up the processing and searching of data in the database.

A "processor" is understood here to be a (usually very much size-reduced and usually freely) programmable arithmetic unit, i.e. a machine or an electronic circuit, which controls other machines or electrical circuits according to transferred commands and in doing so drives an algorithm (process), which usually involves data processing. The processor may, for example, be a main processor, a central processing unit or (more generally) a central processing unit (CPU for short) for computers or computer-like devices in which they execute commands. The processor may also be configured as a microcontroller in embedded systems (such as household appliances, ticket machines, smartphones, etc.).

According to embodiments, at least one of the steps of the method is directly executed by a sub-unit of a processor.

In particular, according to embodiments of the invention, the set operations on the data record IDs may be performed directly by the arithmetic logic unit (often shortened to ALU) of the at least one processor. An ALU may link two binary values with the same number of digits (n). Reference is made to n-bit ALUs. Typical values for n are 8, 16, 32 and 64. According to embodiments of the invention, all data record IDs have a fixed length, in particular an identical length, which is preferably chosen so that each data record ID fits entirely in the working register of the ALU, and may be compared with each other in the course of the set operations in the ALU. In particular, in order to compare two sets of data record IDs, for example to calculate an intersection set, a union set, a difference set or a symmetric difference set, the ALU may compare all data record IDs of one set with all data record IDs of the other set for identity.

Here, "raw data" means any data that is available in electronic form and not yet in a form parsed by a parser of the DMS system. In particular, raw data comprise data that are directly obtained during an observation, a measurement or a data collection and that are still available unprocessed.

A "data processing and search system—DMS system" is understood here as a software-and/or hardware-based system for storing, managing and processing electronic data. According to embodiments of the invention, the DMS system is configured to store large amounts of data efficiently, without contradiction and permanently. According to embodiments, the DMS system may comprise several components, which may be in the form of modules: an import component for receiving and parsing raw data and for storing the parsed data in non-redundant lists. Here, the import component may use existing lists and, if necessary, may create new lists automatically. The DMS system may further comprise a search and analysis component for searching and/or analysing the lists. Optionally, the DMS system may include a GUI that allows users to configure the search in order to specify, for example, whether subordinate and/or superordinate data records or the history of certain data records are also to be output. The DMS system has read and write access to a data memory managed by the DMS system. According to embodiments, the DMS system comprises the data memory and the data value lists stored therein. Optionally, the DMS system may further comprise a document memory for storing at least some of the raw data.

A "logical data record" is understood here to be a group of data values (belonging to an object) with related content, for example item number and item name and date of manufacture. Data records correspond to a logical structure of data values that is recognised, for example, when parsing raw data or when importing field-based raw data. The logical structure of data records specifies how many and which fields this data record contains and which data values are assigned to each of these fields. Physically, however, the data record may be stored differently, in particular in a distributed manner, for example the data values of a data record may each be stored as elements of redundancy-free field-specific data value lists.

The data objects contained in the raw data may already contain data record IDs (for example row numbers of an Excel table with row-wise oriented data records), but according to embodiments it is also possible that the data record IDs are dynamically created by the DMS system in the course of parsing or importing the raw data. In particular, the data record IDs may be generated to explicitly or implicitly encode memory addresses of a row in the address allocation table assigned to that data record.

The logical data record may be an original data record, but preferably it is a data record formed in a transformation step from an original data record by replacing original data values with mapping IDs.

An "original data record" is understood here to mean a group of data values (belonging to an object) with related content, referred to here as "original data values", which have been obtained from raw data, imported automatically or entered by a user. An original data record may consist at least in part of data values that are not numerical (for example words of a natural language).

An "append-only data structure" is understood here to mean a data structure, especially a file, in which new data may be appended to one end of the data structure, but the existing data is unchangeable. The access control lists of many file systems implement an "append-only" permission. For example, the Linux operating system with chattr supports an "append-only" flag to be set on files and directories. Some cloud storage providers offer the option of restricting access as "append-only". This function has been used until now in particular to mitigate the risk of data loss for backup policies, but not to speed up database queries in combination with an address allocation table, since the enrichment of result data record IDs with the field-related data values of these data records is performed on the basis of these data structures. Append-only data structures grow over time.

An "address" is understood here to mean a unique identifier of a logical or physical memory area. Preferably, the memory area is an area within a volatile or non-volatile storage medium (for example RAM, hard drive, etc.) which may be accessed directly with the help of the address. The address is used in memory access to designate the exact location to which access is made. The specifics of the addressing depend on the specific hardware. The address of an AOD entry may be a composite address, the first part of which specifies the memory address of the first written AOD entry and the second part of which specifies an offset relative to that first AOD entry at which the AOD entry designated by the composite address may be found. The address may be a logical or physical address.

In particular, an "address" may be defined as an indication that enables a data processing system to have at least read access to data that is made available at this address. An address may be, for example, a URL to a file available via a network, a local file-system-based address of the file, or an entry within a specific file, or the like.

A "data value" is understood here to mean the smallest evaluable unit of a data record. A data value may, for example, be a string, an image, a pixel matrix, a Unicode character or a numerical value. The data value may be obtained, for example, in the course of a data import, a parsing step and/or a tokenisation step or in the course of a mapping step following these steps, in which original data values are assigned numerical mapping IDs that are ultimately used as data values, assigned to the fields and stored in field-specific data value lists.

A "redundancy-free data value list" is understood here as a list of data values that contains each data value only once. Preferably, the data values are stored in sorted order in the lists to speed up database queries on the lists.

A "field-specific data value list" is understood here to mean a data value list that is assigned to a specific field and represents this field and which selectively contains only those data values that are contained in the data records in exactly this field. The data values may also be mapping IDs assigned to other ("original") data values.

A "time value list" is understood here to mean a redundancy-free data value list of which the data values are time points or mapping IDs of time points. A time value list is preferably assigned here to one of the fields of the data records. Each time value stored in the time value list represents a time point at which a data value of the field to which the time value list is assigned was changed in one or more data records. The IDs of the data records affected by the change at that time point are stored linked to that time value in the time value list.

Since, typically, the change in content of the data value is also stored in a field-specific data value list (for example in the form of a change in the data record IDs assigned to the previous and the new field-related data value, respectively), the combination of the contents of this field-specific data value list and the field-specific time value list reveals both the content and the time of a data value change.

A validity time period is understood here to mean a period of time during which a certain data value is assigned to a field of a data record (and is thus "valid" for this data record and this field). The time period is limited, for example, by a first validity time at which said data value was assigned to the field of the data record (for example by generating or importing the data record for the first time or by overwriting an obsolete data value), and by a validity time period end at which this data value was overwritten or the data record was deleted or treated as an obsolete version.

A "validity time point" is understood here to mean a time point at which a certain data value is assigned to a field of a data record (and is thus "valid" for this data record and this field).

A "data memory" means a storage medium or a memory area on a storage medium, or a combination of several storage media or memory areas, which is used for the storage of data. If the data memory comprises several storage media or storage media areas, these may be connected to each other to form a logical data memory. In this case, the storage media or storage media areas may be operatively connected to each other, for example via a network or via a bus of a computer system. For example, a data memory managed by the DMS system may be a data memory to the data of which the DMS system has exclusive access.

A "field" is understood here to mean a parameter (or "attribute identifier") that represents a specific meaning content and that may be realised in various specific embodiments. For example, a field may represent a property of objects such as colour, building type, width, height, age, density, etc. Depending on the content of the data stored in the data records, the fields may be different. For example, data records representing machines usually have different fields than data records representing people. Depending on the type of raw data and/or parser used, the parsed and imported original data values and/or the mapping IDs assigned to them may have a variety of different fields assigned to them. For example, for medical data, one field may represent the concept of "diagnosis", which may be assigned various specific embodiments ("data values", or "field values") such as "diabetes", "Parkinson's disease", or "skin cancer". Another field might represent "symptom", to which embodiments or data values such as "fever", "chills", "toothache" (or their respective mapping IDs) are assigned. It is also possible for a data value to be assigned to different fields. For example, the data value "silver" may be assigned to a field or concept "metal", but also to the concept "colour" or "surname". Depending on the embodiment, the mapping ID for data values assigned to several different fields may be different or identical depending on the field.

A "computer system" is understood here to mean a monolithic or distributed data processing system, in particular a digital data processing system. The data processing system may thus consist, for example, of a standalone computer system or a computer network, in particular a cloud system. The computer system may also be configured, for example, as a mobile data processing system, for example a notebook, tablet computer or portable telecommunications device, for example a smartphone.

A "system" is understood here to mean a totality of one or more elements (for example computer systems) that is capable of processing data. For this purpose, the system components exchange data and/or control commands. For example, a system may comprise a computer with a DMS system. Optionally, the system may comprise further components, for example one or more client computer systems, which send search requests and/or analysis requests to the DMS system.

A "data structure" is understood here to mean an object that is used to store and organise data. In particular, it is a structure because the data are arranged and linked in a certain way to enable them to be accessed and managed efficiently.

A "consolidation time point" is understood here as a point in time. In particular, a consolidation time point may be a point in time at which specific data of a DMS system are integrated with other data of the DMS system. For example, data in the AOD data structure, the negative lists and/or positive lists, which contain changes to the data values and/or changes regarding the assignment of data values to logical data records, may be integrated into the field-specific data value lists in the course of a consolidation, so that the field-specific lists also contain said changes after the consolidation.

BRIEF DESCRIPTION OF THE DRAWING

In the following, embodiments of the invention are described with reference to the drawing. In the drawing

FIG. 4 shows examples of different types of raw data;

FIG. 5 shows examples of the transformation of raw data into field-specific data value lists;

FIG. 1 shows a block diagram of a system 100 with a DMS system 102 for performing database queries on a database 104. The system 100 may in particular be a computer system with one or more processors, for example a database server.

Figure 7:
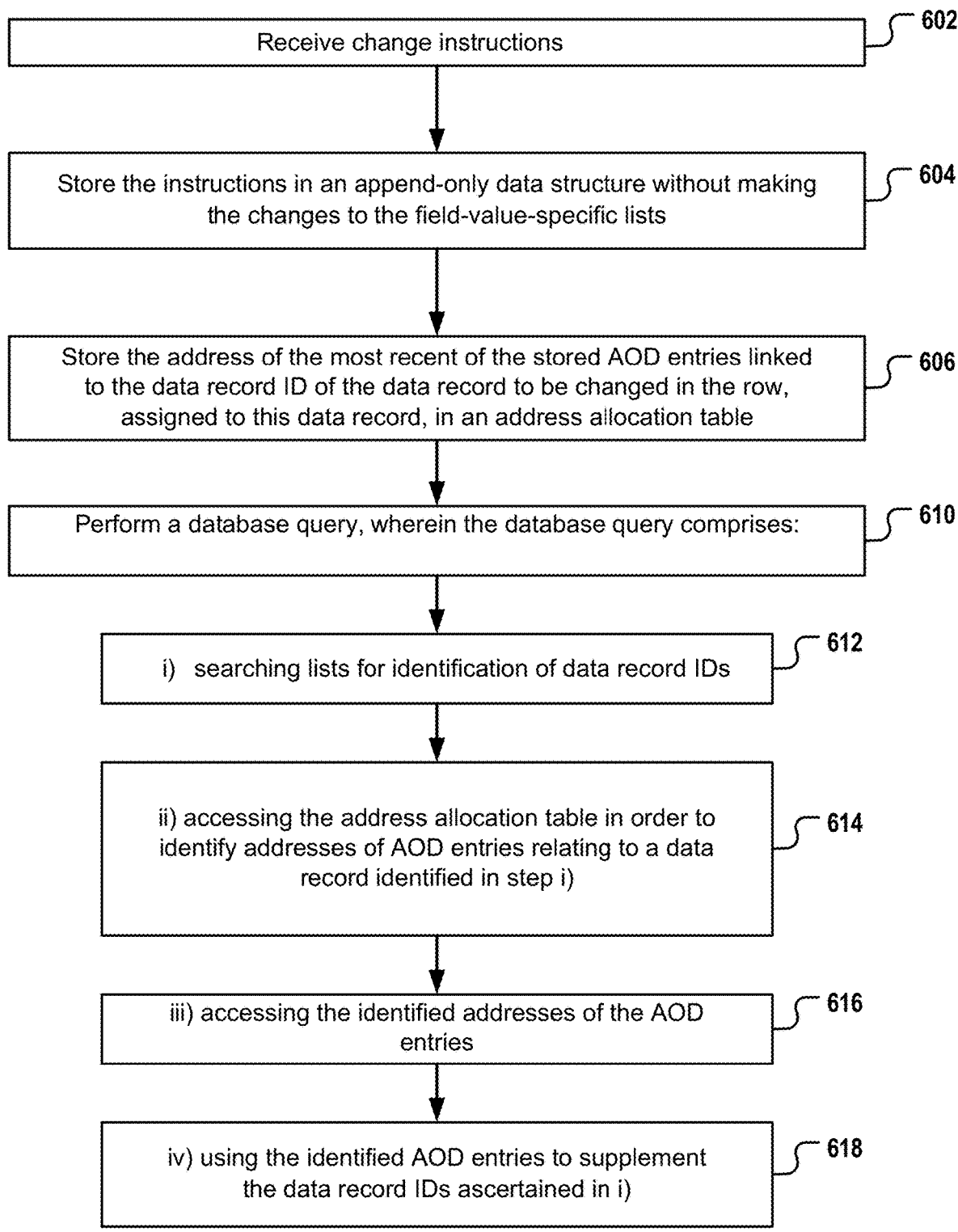
FIG. 7 shows a flowchart of a method for performing a database query.
Figure 8:
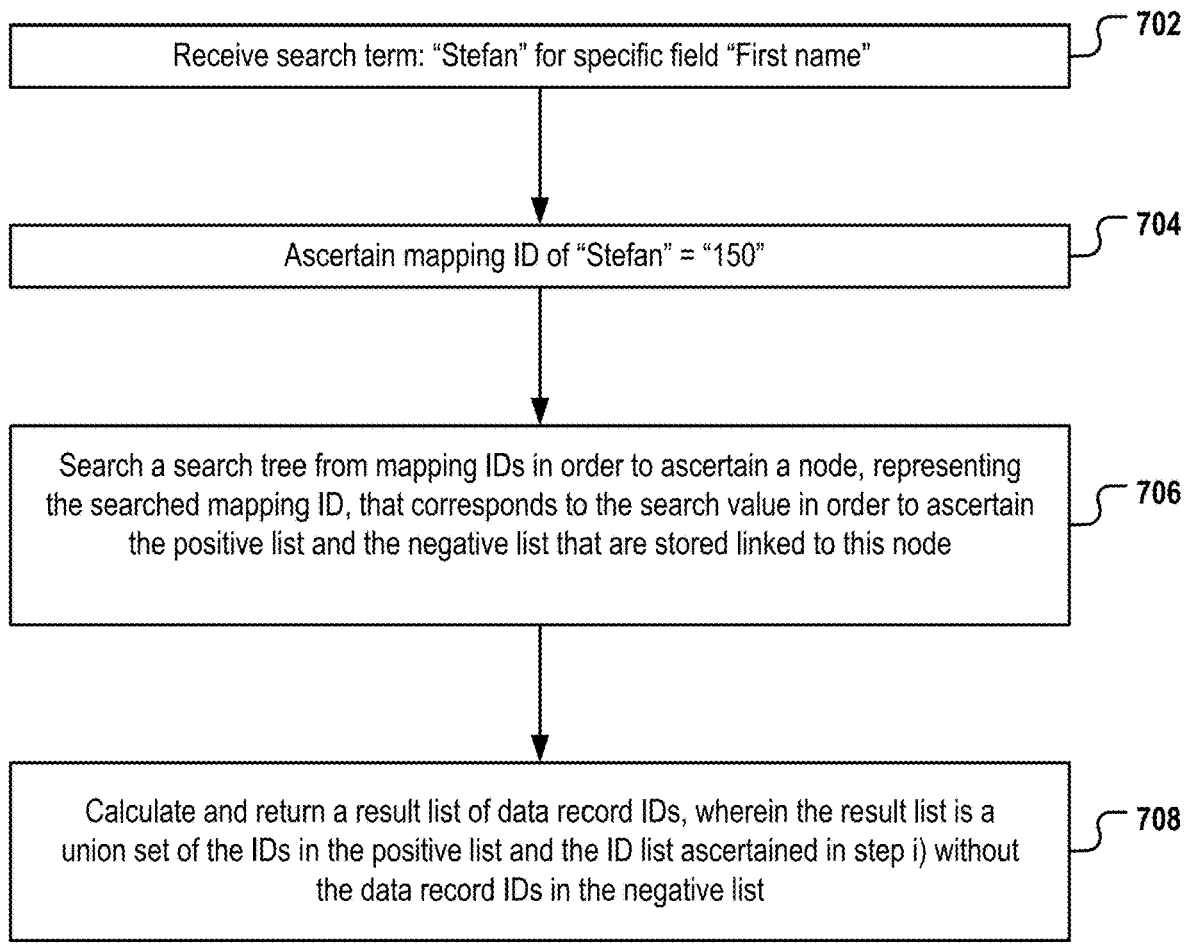
FIG. 8 shows a flowchart of a method for considering not-yet-consolidated data value changes in a database query.

For example, the system may be used to perform the methods illustrated in FIGS. 7 and 8. Therefore, in the following, the system 100 and the method of FIG. 7 are described together with reference to the two respective figures.

For example, the system and method may be used to integrate a large amount of heterogeneously structured raw data 112 and make it searchable and analysable in an efficient and flexibly expandable manner.

For example, the raw data may include XML files of different content and structure, JSON files, text files in various formats (for example Microsoft Word, OpenOffice, Adobe Acrobat PDF files, TXT files, etc.), different tables from one or more different relational databases, media data or hierarchically organised data, for example object trees. In some raw data, data objects, their data values and optionally also their semantic meaning may be more or less explicitly identified, for example in database tables, Excel files and other comparatively highly structured data with corresponding fields and field identifiers. In other raw data (for example image data), the data objects and their data values may not be explicit, but implicit. This means that the data objects and their data values are only recognised and extracted as such in the course of a parsing process.

Several different syntactic and/or semantic parsers 118-130 may be used to parse the various raw data. The parsers are preferably in exchange with the DMS system or other components of the DMS system during parsing, for example to be able to determine, when dynamically creating a data record ID for a data object corresponding to a logical data record, whether this ID is really unique or already occupied by a data record ID used in one of the data value lists.

The data record IDs may be identifiers of logical data records that are already predefined by the raw data and are adopted by the DMS system as data record IDs. Alternatively, the data record IDs may also be generated during the import or generation of the data records.

The data values of the generated, parsed and/or directly imported logical data records are stored in corresponding field-specific data value lists according to the semantic concept assigned to them by the field identifiers of the raw data or by the parsers.

The storage of logical data records in several field-specific data value lists resolves the object structure, i.e. the question of which data values or semantic concepts are present in a particular data object, to a certain extent, or the physical organisation of the data values on the memory is not oriented to their logical affiliation to the data records.

After the logical data records have been successfully stored in the database 104, the database is initially in a consistent state at a "first time point". The first time point is also referred to as the "most recent consolidation time point". At this time point, the database thus contains the entirety of the logical data records previously stored in the database in the form of the field-specific data value lists, including a mapping table. The entirety of the field-specific data value list represents the static part 101 of the database at the first consolidation time point.

At later times, 602 the DMS system 102 receives a wide variety of instructions to change data values, for example instructions to delete or change individual data values or to delete or add entire logical data records. The instructions may be received, for example, from query systems that are software programs or hardware components or that are the digital representation of a natural person.

These received change instructions are not initially executed on the field-specific data value lists. Rather, the instructions are stored 604 in an append-only data structure 202 without executing the changes on the field-specific data value lists 116. Each entry in the append-only data structure-referred to herein as an AOD entry-includes at least those of the field identifier data value pairs of one of the data records that are to be changed in accordance with one of the change instructions. Optionally, the DMS system may be configured to create and store the AOD entries in such a way that they contain not only the changed data values but all of the current data values of the data record to which the AOD entry relates (so-called "complete" or "completely loaded" AOD entry). For example, the DMS system may be configured to store the AOD entry as a complete AOD entry upon receipt of a certain minimum number of change requests relating to a particular data record. Another criterion for storing complete AOD entries may be the exceeding of a search query duration. Thus, the number of AOD entries that by reference For each of the data records for which the database receives one or more instructions to change data values after the most recent consolidation time point, the DMS system 102 stores the address 206, 208 of the most recent of the stored AOD entries specifying a change to that data record, linked to the data record ID of that data record, in an address allocation table 226. Details of this step and the nature of the AOD entries are further illustrated, for example, in FIG. 3. The links in the address allocation table are automatically updated so that, for each of the data records, the address of the one of the AOD entries that contains the most recent changes to that data record is always stored. The append-only structure therefore also includes changes and supplementations that have not yet been consolidated with the static part 101 of the database. The append-only data structure, at least its entries as of the most recent consolidation time point, as well as some other optional data structures described later, such as the negative lists and positive lists, belong to the dynamic part 103 of the database 104.

The DMS system then performs 610 a database query. For example, the database query may be performed in the course of a complex data analysis or in response to receiving a search query from a query system.

The database query contains one or more data values, also called search values, which refer to one each of the fields of the data records.

The database query includes a first step i) 612 of searching, for each of the search values, the field-specific data value list corresponding to the field of that search value with the search value to identify IDs of data records 214 of which the content is to be returned in whole or in part based on a match with one or more field-specific search values. For example, the search could include the search values First name=Peter and City=Berlin. Preferably, the search values are mapping IDs and may be ascertained, for example, by matching a primary search value entered by the query system with the mapping table to ascertain the mapping ID assigned to that primary search value. For example, "Peter" could have the mapping ID 2392 and "Berlin" could have the mapping ID 68672. The search would thus contain, for example, the search values First name=2392 and City=68672. Searching for 2392 in the First name data value list could yield a set of "first name hit" data record IDs, searching for 68672 in the City data value list could yield a set of "city hit" data record IDs, and the intersection set of the first name hit data record IDs and the city hit data record IDs may represent the set of data record IDs ascertained in step i). For example, in step i) the two data record IDs 5578 and 5907 could be ascertained, both representing a person with the first name Michael and a residential address in Berlin.

The next step ii) 614 is to access the address allocation table 226 to identify addresses of AOD entries assigned to one of the data record IDs identified in i). For example, the DMS system may be configured to select the IDs of new logical data records such that those IDs encode the memory address of the row uniquely associated with that logical data record in the address allocation table, either explicitly (for example as a memory address) or implicitly (for example as a sequential number of rows in the address allocation table that, by multiplication by a row memory size, gives the memory address of the row relative to a base address (for example, file start)). The address allocation table may be accessed by ascertaining the memory addresses of the rows in the address allocation table uniquely assigned to these IDs from the data record IDs ascertained in step i), and using these memory addresses for direct access without a search process.

For example, the data record IDs ascertained in d) could comprise an ID of a personal data record, wherein the ID may be, for example, "5578", wherein this value may also be, for example, the memory address of the row uniquely assigned to this data record in the address allocation table.

Thus, in order to now output the complete personal data record of person 5578, it is not necessary to modify the database query used in step i) in any way. It is sufficient that the data record IDs of the data records to be returned obtained in step i) are used as keys (and in some implementation variants as memory addresses of address allocation table rows) in the address allocation table to first identify the address allocation table rows uniquely assigned to the data records ascertained in i), and to evaluate these rows. The ascertained address allocation table rows each contain the address of the AOD entry that contains the most recent change to the data record to which that row is uniquely assigned. The DMS system only needs to directly look for this AOD entry address in order to find out at least the property of this person (for example telephone number) that has been changed according to this AOD entry.

In the next step iii), the DMS system accesses 616 the identified addresses of the AOD entries. If this AOD entry is a full (or "complete") AOD entry, i.e. contains all currently valid data values of the person, the data values specified in the full AOD entry may be used to output the data record of the person 5578 including all person attributes. If said AOD entry does not contain all current data values, it preferably contains at least an address for the next older AOD entry that relates to the same person 5578 and contains other changes relating to, for example, address, telephone number, place of work, etc. If this next-oldest AOD entry is a complete AOD entry, the search of the append-only data structure for person 5578 may be terminated. If not, the address contained in this AOD entry is followed to the next-nearest oldest AOD entry and this step is repeated, if necessary, until there is a corresponding data value for all fields of the logical person record.

In step iv) 618, the DMS system uses the change information contained in these identified AOD entries to add the field identifier-data value pairs to the data record IDs ascertained in step i) and output them.

In this way, the field-specific data values of all data records of which the ID was ascertained in step i) and optionally also super- or subordinate data records and/or historical versions of these data records may be ascertained.

A search query may ascertain any data values of data records and even of further data records connected to these data records by relations in a highly efficient manner, wherein the search is based substantially only on data value lists and the completion of the result data records to be output is based substantially on jump addresses. This makes the search performant and resource-efficient. The data value lists are preferably sorted, redundancy-free lists of numerical values, in particular of mapping IDs, so that all steps i-iv may be carried out in a highly performant manner.

According to some examples, the DMS system may be configured to consolidate the dynamic part 103 of the database with the static part at regular or irregular intervals. This means that the data record changes cached in the dynamic part are now stored in the field-specific data value lists. For example, the consolidation may be performed by a consolidation module 105, and the database query may be performed by another module 106. For example, the module 106 may be configured to receive search queries via a network interface from one or more client computers, or via a GUI directly from a locally working user. Additionally or alternatively, the module 106 may also contain a plurality of complex analysis functions based on set operations on multiple field-specific data value lists and optionally also negative lists and/or positive lists.

Thus, the static part represents the database at a certain consolidation time point and may be used to calculate consistent evaluations and analyses on the data available at this time point. All changes from this fixed time point are initially only managed in the dynamic part 103 of the database, which includes in particular the part of an append-only data structure that has not yet been persisted as well as positive lists and negative lists. The append-only data structure may therefore consist of a static part, which comprises the change instructions and AOD entries that have already been consolidated, i.e. persisted in the field-specific lists, and a dynamic part. The dynamic part comprises the changes not yet consolidated (persisted in the data value lists) at the most recent consolidation time point. With each consolidation, the boundary or division of the consolidated and non-consolidated AOD entries shifts, wherein each boundary corresponds to a consolidation time point.

At any moment in time, this dynamic component of the database may be consolidated, i.e. integrated into the static component 101 and replaced by a new, empty dynamic component. In this way, the previous dynamic component becomes static and may be merged in the background with the previous static component to form a new static database component. When this is finished, the previous static and dynamic components may be saved and/or deleted.

The consolidation module 105 may, for example, provide an API via which users and external programs have the option, when searching, of using for example only the static component or both components or, if necessary, only the dynamic component as the basis for the search.

The great advantage of implementation variants lies in the updatability during ongoing operation, as all components may be frozen to ensure reorganisation during ongoing uninterrupted operation, including optimisability. Parallel operation of the static and dynamic components of the database is possible, as is also the updatability of the database.

Figure 2:
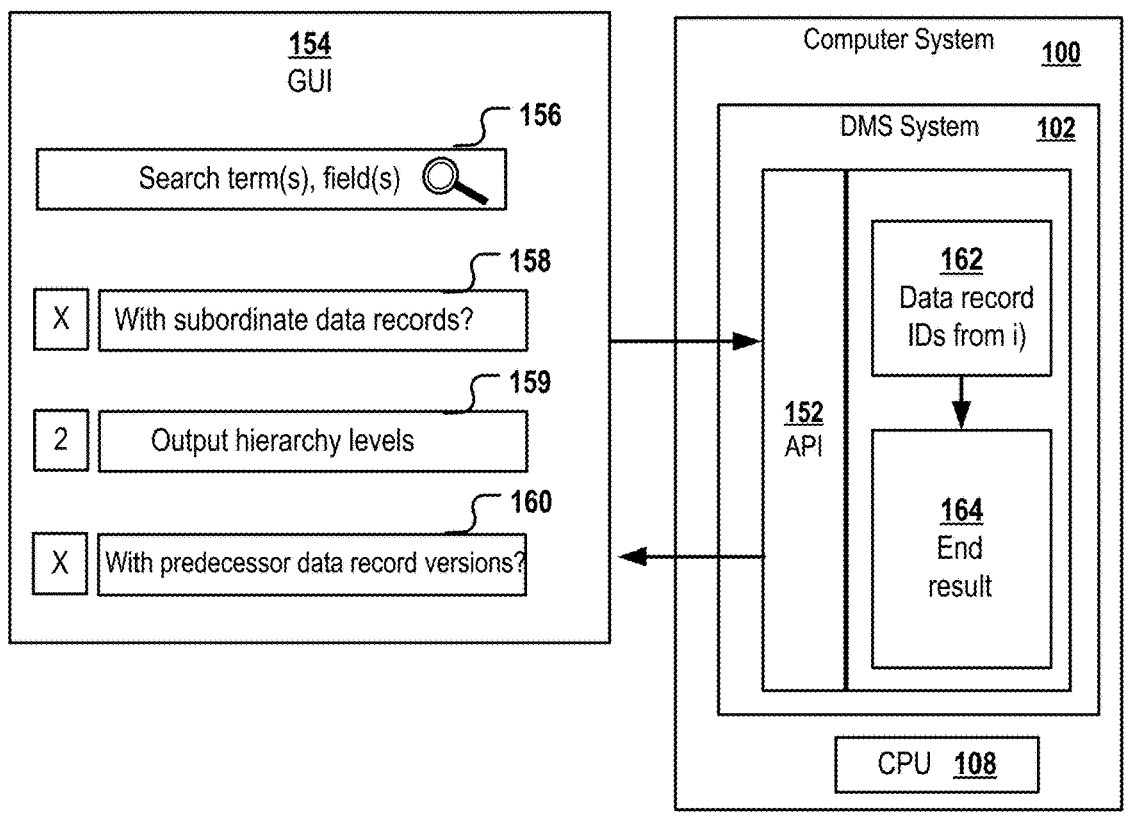
FIG. 2 shows a block diagram of a GUI for specifying a search query.

FIG. 2 shows a block diagram of a GUI 154 for specifying a search query. For example, the GUI may contain several input fields, for example one or more input fields 156 for specifying one or more search values and the fields assigned to them, as well as further fields 158, 160, which allow the user to specify whether, in addition to the actual result data records, further data records are to be returned which have a logical and/or temporal relationship with the result data records. For example, the user may specify whether, in addition to the result data records that are ascertained on the basis of a match with the search terms entered in field 156 in step i), data records that are subordinate or superordinate to these result data records or that represent previous versions of the result data records are also to be output. In other examples, in addition or as an alternative to these fields 158, 160, the GUI may also include fields for entering times or time periods so that the user may limit the search to specific validity times or time periods.

In some examples, the GUI may include input fields 159 that allow the number of iterations (data record hierarchies) to be specified up to which superordinate and/or subordinate data records are to be ascertained and output.

In addition or as an alternative to a GUI, the DMS system may also provide other interfaces, in particular an API 152, via which other software programs may enter search queries and the additional parameters described here (determining whether a superordinate or subordinate data record are to be output, whether previous versions are to be output and/or whether the search is to be limited to a validity time period).

In a first step i), a set of data record IDs is ascertained on the basis of the field-specific search values and the field-specific data value lists, which may also be regarded as an intermediate result 162. In further steps ii-iv), the current field values assigned to these data record IDs are ascertained and complete data records 164 supplemented by the field-specific data values are output as the end result. The data values of the output data records may in particular be mapping IDs or the original data values of the raw data assigned to the mapping IDs in a mapping table.

Figure 3:
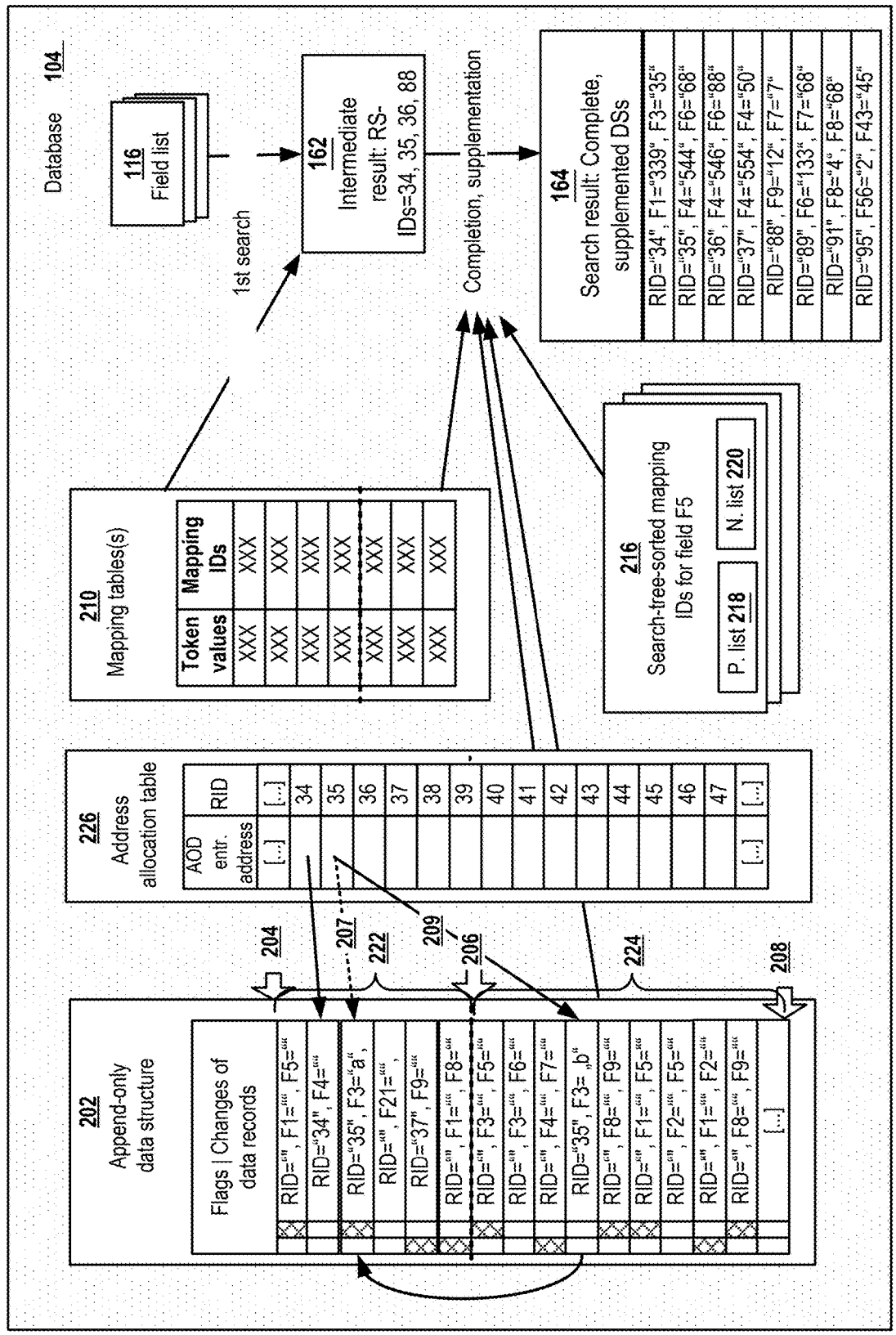
FIG. 3 shows a block diagram of different data structures of a database.

FIG. 3 shows a block diagram of various data structures of a database 104.

The data structures used for data storage according to embodiments differ from other databases in that no indices are present and/or required or used in addition to the data structures used for the actual data storage. The data management structure enables all queries, selections and evaluations in any combination, even with large amounts of data.

When importing raw data, key-value pairs (a key is a field that typically represents a parameter or attribute) are transformed into dimensionless data record IDs (RIDs). All key/value pairs that occur in a data record will have the same RID.

Thus, database queries for arbitrary combinations of key/values ultimately yield combinations of RIDs of which the intersection set, difference set, symmetric difference set and/or union set ultimately yields the result.

The data structures comprise an append-only data structure 202, for example an append-only file. All changes to logical data records are written to this in the order in which the change requests are received by the DMS system and may no longer be changed. For example, the changes may consist of only individual data values of a data record and may include, for example, a supplementation of a new or additional field-data value pair to the data record, but also a deletion of a field-data value pair or a replacement of one data value by another. The changes may also relate to entire logical data records and may, for example, provide for the deletion or initial storage of entire data records.

Each entry in the append-only data structure is represented as a line in the block 202. For example, each AOD entry may contain one or more identifiers (flags). The flags may, for example, be in the form of bit values and include, for example, whether superordinate or subordinate values exist for a data record, whether the AOD entry is a complete AOD entry or not, whether previous versions of the data record exist, etc.

The dashed line 206 marks the first time point (most recent consolidation time point). All AOD entries 222 above the line are already consolidated at the most recent consolidation time point; all AOD entries 224 below this line are not yet consolidated. The arrow 204 represents the first AOD entry of the data structure. For example, its address may serve as the base address, and the address of all other AOD entries is a combination of this base address with an offset. The arrow 208 indicates the end of the data structure 202, to which further AOD entries are continuously appended according to received change requests.

The data structures may further include an address allocation table 226. This assigns an address of an AOD entry to each logical data record in the database 104. This AOD entry is the most recent AOD entry in the append-only structure that specifies a change to that one data record. For example, in table 226, the data record with data record ID ("RID")=35 is currently assigned an AOD entry stating that field F3 has the data value "b" (see arrow 209). However, at an earlier time, the data record with RID35 had been assigned a different data value "a". This earlier change corresponds to the third AOD entry from the top. At this earlier point in time, in the address allocation table, RID 35 was linked to the address of the third-from-the-top AOD entry, as shown by the dashed arrow 207. However, this address has since been replaced by the address of the AOD entry referenced by the arrow 209. However, this AOD entry 209 contains the address of the most recent AOD entry 207 written even before this AOD entry, which refers to the same data record RID=35. Thus, the DMS system may simply follow the addresses within the AOD entries to the next most recent AOD entry of the same data record to obtain all current data values for all fields of data record 35.

In FIG. 3 and other figures, data values that are easily understood by a human have been used for illustrative purposes. Preferably, however, the field-specific data values of the logical data records are numerical values uniquely assigned in a mapping table 210 to the data records obtained from the raw data and/or initially entered. These numerical values are also referred to as mapping IDs and are preferably used as the data records that are stored in the field-based lists and matched with the search value during the search. Mapping table 210 schematically shows the assignment of original data values (here: words) to mapping IDs.

The mapping table 210, for example, serves the purpose of representing all data values to be distinguished by a mapping ID (MID). According to some implementation examples, each data value is only stored via its MID in the field-specific lists, so that all MIDs occurring in its context are stored for each FID. The data values may be classified by field or by data type, for example char, text, integers, float, date/time stamp, UUID values, binary values, etc. For each field or for each data type, for example, the MIDs may be sorted so that the MIDs in the mapping table 210 are stored in the same order as if the associated original data values were sorted. This makes it possible to sort the contents of a field-specific data value list with their MIDs occurring there without having to load the contents themselves first. This means that the MIDs would be assigned to the first name list Anton-Bertram-Christoph-Doris-Emil in such a way that the numerical value of the MID of Anton comes before all other first name MIDs in the sorting order of the mapping table, the numerical value of Bertram would come in second place, and so on.

The data structures may additionally include field-specific data structures 216 containing sorted and searchable data values, each stored linked to a negative list 220 and a positive list 218. These may be used to include also changes not yet consolidated and stored in the data value lists 116.

For example, after receiving a search query with a field-related search value, the DMS system may first translate the search value into a mapping ID using the mapping table 210. This mapping ID is then used to search the field-specific data value list 116 that represents the field to which the search value is assigned. Optionally, in this step i), a sorted array 216 of data values or mapping IDs may also be searched, which contains not yet consolidated changes stored in the form of negative lists and positive lists, in order to still expand and/or reduce the data record IDs obtained on the basis of the data value lists 116 in such a way that the not yet consolidated changes are taken into account. The data record IDs thus obtained in this first search step i) are used as an intermediate result 162, which in the subsequent steps ii-iv) is enriched with further data. The further data may include data values of the data records ascertained in i) and optionally also further data records which are superordinate or subordinate to the data records ascertained in i). The enriched data are returned as result 164.

In the following, some specific examples of some of the data structures of FIG. 3 are described according to exemplary implementation variants.

The logical data records each consist of one or more field-data value pairs, wherein the data values are mapping IDs. A logical data record may consist of any number of such pairs. The address allocation table 226 references the AOD entry within the append-only data structure 202, which stores the data values of the individual fields of various logical data sequence in the order in which corresponding change instructions are received. New AOD entries are generally written to the end of the data structure 202, wherein, in the course of generating a new AOD entry, the DMS ascertains the differences of the new data record from the previous data record and specifies and stores the changes in the new AOD entry. The new AOD entry contains a jump address ("pointer") that refers to the previous content. In particular, the pointer may specify a file offset that is calculated starting from the first AOD entry within the data structure 202. Once written, the AOD entries are never changed again, but only added to. Since, in each logical data record, according to some implementation variants, the same field may occur multiple times in a logical data record and may be assigned different mapping IDs, each replaced field-data value pair is preferably also stored in a negative list, while the now current field-data value pair is written to a positive list. The first time a field-data value pair is added to a data record, the new field-data value pair is added to the positive list. In the case of a deletion, the field-data value pair is added to the negative list. The positive and negative lists are described in greater detail, for example in relation to FIG. 9. In order to optimise the system loading in the case of many edits, according to embodiments of the method each AOD entry contains an identifier (a flag) that specifies whether the current AOD entry requires loading of the predecessors ("incomplete AOD entry") or not ("complete" or "completely loaded" AOD entry). However, the history of all change requests is still available and may be stored, for example, as a blockchain in a tamper-proof manner.

Additionally or alternatively, the AOD entries may also include other identifiers, for example identifiers that specify whether the AOD entry refers to a data record to which there are superordinate and/or subordinate data records (identifier relating to so-called "repeat groups"). Preferably, at least some of the logical data records contain a corresponding reference field, for example an "is-superordinate-to" and/or an "is-subordinate-to" field. This field contains the IDs of the data record that is superordinate or subordinate to the relevant data record with the field. If several components are to be entered for an engine, the components are stored, for example, as logical data records with their article number and their technical properties, wherein the component data records in the "is-subordinate-to" field contain the data record ID of the engine. If a component entry is made after the engine data record has been written, a change to the engine's logical data record is written by a supplementary AOD entry consisting only of an "is-subordinate-to"=TRUE identifier. This may be done, for example, by storing a bit value of 1 for this identifier. Now, any number of new component data records may be generated and corresponding AOD entries may be written, the common feature of which is the field data value pair "is-subordinate-to"-"engine MF-3000". During data output, if extended or recursive output is desired, not only a specific component may be output, but also information regarding the engine type in which it is installed or may be installed. This process may be applied recursively, as for each engine there may be a superordinate vehicle which contains this engine. Therefore, it is possible to write and output arbitrarily nested contents without knowing the structure of the data beforehand.

In some implementation examples, the append-only data structure also supports the storage and reconstruction of complete temporal histories relating to the change of logical data records. In the example below, the field ID (FID)=2 is reserved for the concatenation of history information. If, for example, a person's address changes due to moving house, the previous address is not wrong, but its temporal authority ("validity") has expired. Therefore, its field-related new data values (new street, house number, post code, town) are transferred to a new logical data record DSneu, in which the ID of the previous data record (DSalt thus the ID of the data record that represents an obsolete version of the new data record) is entered in FId=2. The old data record DSatt is stored with two timestamps (from/to) in the form of an AOD entry. This validity time period of a logical data record and the AOD entry corresponding to it results from the validity period during which its data were valid.

The end of this time period thus also automatically determines the start of the validity of the current (or more current) data record and at least one of its values. The start of the validity of the AOD entry for the data record history of events ("history entry") either results from a previous validity or may be set manually. The following example based on original data values shows AOD entries with reference to previous version data records and hierarchically linked data records.

Data Record:
    Company="Cortex Innovations"
      is-employer-for="Employee A, 1.2.1990-Employee B, 7.12.1988-Employee C, 1.5.2001
      Offices="Isernhagen, Tischlerstr. 1a, 30916, Lower Saxony—Bendeleben until territorial reform: Kalkuferstr. 7, 99707 Bendeleben—Bendeleben after territorial reform: Kaluferstr. 11, 99703 Kyfhäuserland This results in the following representation in the append-only file, wherein the field with FID=1 contains a reference back to a data record predecessor version, wherein RID is the identifier of a data record ID, and wherein the identifier ha_nR ("has nested records") indicates whether further data records exist that are hierarchically related to the data record to which the AOD entry relates:

RId:4711: Company Cortex Innovations Flag:has_nR
    RId=4712, FId:1=4711 FId:12=First name-employee-A FId:13=Last name-employee-A, FId:4:1.2.1990
    RId=4713, FId:1=4711 FId:12=First name-employee-B FId:13=Last name-employee-B, FId:4:7.12.1988
    RId:4714, FId:1=4711, FId:12=First name-employee-C, FId:13=Last name-employee-C, 4:1.5.2001
    RId:9876654, FId:1=4711, 2: First name-employee-D, 3: First name-last name-D, 4:8.6.54
    RId:123456789 FId:1=4711, FId:47=Isernhagen, FId:46=30916, FId:50=Tischlerstr. 1a, FId:55=Lower Saxony
    RId:1234568 FId:1=4711, FId:47=Kyfhäuserland, FId:46=99703, FId:50=Kalkuferstr. 11, FId:55=Thuringia
    RId=999991234 FId: 2=1234568, FId:47=Bendeleben, FId: FId:46=99706, FId:50=Kalkuferstr. 7, T1=1, T2=30.05.2017

The example shows that the AOD entry referring to the data record RId=999991234 not only contains an ID of this data record RId=999991234, but also contains the RID of the predecessor version of the same data record in the field with the FID=2, namely 1234568. The DMS system may, if the complete history or only the previously valid version of the data record for the Cortex company is to be output, search the address allocation table for the content of the previous version reference field (FID=2), i.e. for the value 999991234. It will thereby be sent to the address of the AOD entry that contains the last change of this previous version, so that the data contained in this AOD entry as well as, if applicable, further historical data that may be reached via jump addresses within this AOD entry may be output.

FIG. 4 shows examples of different types of raw data that are decomposed by the DMS system into original data values, in this case strings of Unicode characters, and assigned to fields that are mapped to mapping IDs and the mapping IDs are used as data values of logical data records. These logical data records are stored in the form of field-specific data value lists, which are actually field-specific mapping ID lists. In the following, for illustrative purposes, the originally obtained data values are described as the data values of the logical data records, but preferably the data values of the logical data records and the field-specific data value lists are the numerical mapping IDs of these original data values.

For example, the data structures 302, 304 and 306 are product data sheets of engines of a manufacturer in JSON format (shown here as a tab-delimited text file for space reasons). For example, the import of the logical data records obtained from the raw data into the database may be done in such a way that each of the three JSON files 302, 304 and 306 is interpreted as a separate data object or separate logical data record, each with a data record ID. Each data object contains several field-data value pairs, such as a specific data value for the field "Power", a specific data value for the field "Torque", etc.

The data structure shown below is an Excel table with a specification of various properties of paints of a paint dealer. Each row 308-313 contains exactly one data object (data record). During the parsing process, each recognised data object may be assigned, for example, the row number in combination with an identifier of this Excel table as a data record ID.

Some of the raw data may be provided in the form of text data, for example text files 314-318. For example, a purely syntactic parser could be used to decompose this text into individual words (each acting as a data value). For example, the syntactic parser may be a tokeniser that decomposes natural-language text into words that (apart from some stop words if necessary) act as data values. In this case, the words/data values may, for example, be automatically assigned a field during import, for example by automatically recognising their semantic meaning through NLP techniques.

Another part of the raw data may be provided, for example, in the form of trade register extracts 320-324. These may contain a mixture of key-value fields and free text.

The raw data come from different sources, but in part have overlapping content ("Gelb-AG"), in part ambiguous data values ("silver"). Nevertheless, embodiments allow an efficient integration and processing of all these data while resolving semantic ambiguities, for example by taking the context of the raw data into account during the import and interpreting the data value "silver" as a surname or as a metal, depending on the context, and storing its mapping ID either in the first name data value list or in the metal data value list together with the associated data record ID or, if this mapping ID already exists there, expanding the set of data record IDs assigned to this mapping ID accordingly.

FIG. 5 shows examples of the transformation of some of the raw data shown in FIG. 4 into field-specific data value lists. Here too, in preferred implementations of the method, numerical mapping IDs of the original data values are actually stored in the lists, but, for illustrative purposes, lists with the original data values are shown here.

The data values shown in the redundancy-free lists 402, 404, 406, 408, 412, 414, 416 are also only a selection, typically the lists are considerably longer.

All field-specific data value lists generated and managed by the DMS system according to an example illustrated herein are redundancy-free, i.e. they contain each data value only once. Preferably, the data values are also sorted so that a sequential search within the lists may be aborted if, on the basis of the sorting of the search term in the order and the already searched data values of the list, it is excluded that a further search within the list will result in a hit.

For example, the logical data records include the following fields: Colour, Manufacturer, Paint ID (of the manufacturer), Surname, and Metal types. These fields are represented by the field-specific data value lists 402, 404, 406, 408, and 412 respectively.

It is possible that the same data value "Gelb-AG" is assigned to different fields depending on the context. For example, the data value "Silver" is a colour in some logical data records and is stored in list 402 linked to the data record IDs of those data records that contain the value "Silver" as a colour identifier. The data value "Silver" may be assigned to the field "Metal type" in other logical data records and is stored in list 412 linked to the data record IDs of those data records that contain the value "Silver" as a metal type.

The storage of data values in the lists is dependent on their respective fields to which they are assigned, but independently of the affiliation to logical data records. Thus, the original structure of the data objects in the raw data was completely dissolved in structural terms when the lists were generated, because the assignment of data values to the data records is only still present and reconstructable in the form of the data record IDs.

Preferably, the data structures also comprise a redundancy-free data value list 414 representing an "is-subordinate-to" relation type between different data records and/or a redundancy-free data value list 416 representing an "is-superordinate-to" relation type between different data records.

For example, the list 414 contains a non-redundant, sorted list of individual data record IDs that may be searched quickly because of the sorting. These data record IDs are stored in the "Key ID" column. Each of these "Key IDs" is stored linked to one or more data record IDs of data records that are superordinate to this "Key ID". For example, the IDs in the key ID column of list 414 may represent specific components that may be incorporated into one or more larger components, such as engines. For example, the component with data record ID (RID) 304 may be incorporated into engine types MF-3000, MF-3020 and MF-6000. These engine types are therefore in a way superordinate to these components.

For example, the DMS system may receive a search request for engine components and, in a step i), first ascertain only the data record ID of these components. If the request specifies that superordinate components are also to be output, the list 414 with the data record IDs of these components is searched to ascertain one or more data record IDs of engine types (or other superordinate components) and also to complete and output the data record IDs of these superordinate engines or components with attributes (data values).

An analogously, it may be specified in the request or, for example, in a configuration file of the DMS system that, in addition to the hits on the search values of the query, data records are also to be returned that are subordinate to these hits. Thus, it is also possible, for example, to first process a database query that ascertains one or more engine types, wherein the IDs of those data records that are subordinate to these engine types, for example because they represent components of these engine types, are also ascertained automatically by analysing the data value list 416.

By providing non-redundant data value lists 414, 416 representing relationships regarding the superordination or subordination of data records, it is possible to efficiently output a great deal of contextual information of the results for every conceivable search query without requiring a specification of complex and therefore usually very slow database queries. By iterative repetition of the search in the last 414, 416 it is possible to output also superordinate and/or subordinate data records of the $2^{nd}$ March or further levels. Thus, for example, in the case of very complex machines, the totality of their sub-components down to the individual screw may be ascertained and output very efficiently for each component.

Thus, a highly efficient search and aggregation facility for data records linked by hierarchical relationships is provided, which may also be used by data processing devices with little RAM and/or computing capacity.

Figure 6:
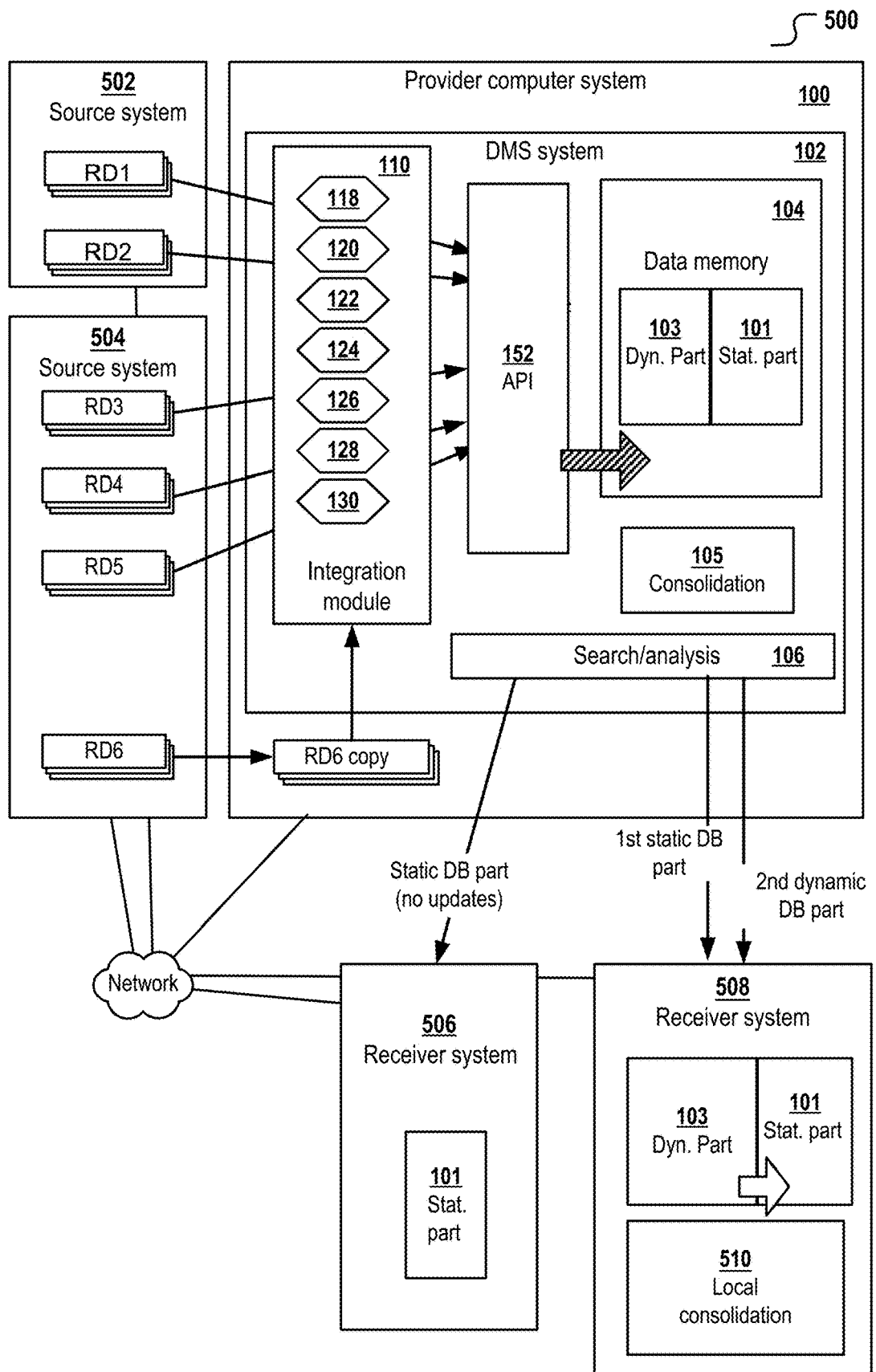
FIG. 6 shows a block diagram of a distributed system for using consolidated and non-consolidated versions of a database.

FIG. 6 shows a block diagram of a distributed system 500 for using consolidated and non-consolidated versions of a database.

For example, the system 500 may comprise a provider computer system 100 and one or more receiver computer systems 506, 508. The receiver computer system is used to store and keep current logical data records in the form of non-redundant field-specific data value lists in a database 104. For example, according to some implementation variants, the provider computer system 100 may include the DMS system 102, which may receive and process search requests via an API and/or may be coupled via the API to various source systems 502, 504 from which raw data are received, processed and stored as logical data records in list form. As already described, the database may, for example, comprise a static database part 101 at a specific time point (consolidation time point). This comprises in particular a plurality of logical data records of which the field-specific data values are stored in a distributed manner in the form of field-specific non-redundant data value lists. Changes to the existing and already consolidated data values and/or data records are initially not stored in these field-specific data value lists, but in the form of AOD entries within an append-only data structure and preferably in the form of negative and/or positive lists. The not yet consolidated portion of the append-only data structure, as well as the negative lists and positive lists, represent the dynamic portion 103 of the database 104. Preferably, only the provider computer system 500 contains suitable programs for importing new data records, for example via parsers 118-130 or other program modules 110 capable of extracting logical data records from raw data. This ensures that there is only one database instance that is continuously modified and updated, and that different instances of the same database are not modified independently of each other and thus may become inconsistent.

However, it may be necessary to physically replicate the database content to local memory of one or more recipient systems, for example to ensure that the receiver systems may also access the database content regardless of the availability of a network connection. It is often sufficient for this purpose to transfer only the static part 101 of the database to the receiver computer system 506, for example if the receiver computer system does not necessarily always need to have the most recent version of the database 104 and it is sufficient if the local copy on the receiver computer system 506 is consistent within itself.

According to some examples of the system 500, not only is the static part automatically replicated from the provider computer system 100 to the receiver computer system, but also the dynamic part. This is illustrated in FIG. 6, for example, with respect to the receiver computer system 508. In this case, the receiver computer system 508 also contains a module 510 for consolidating the static part with the changes specified in the dynamic part and for analysing also the dynamic data structures (positive lists, negative lists, non-consolidated part of the append-only data structure) in the course of the processing of a database search query.

Typically, the individual computer systems 500, 506, 508, 502, 504 are connected via a network, for example the Internet.

However, the system architecture 500 shown in FIG. 6 is just one of many possible options. Many alternative architectures are possible. For example, the processing of raw data may be performed on a different data processing system, such as storing the database 104 and performing database queries and database consolidations.

Figure 1:
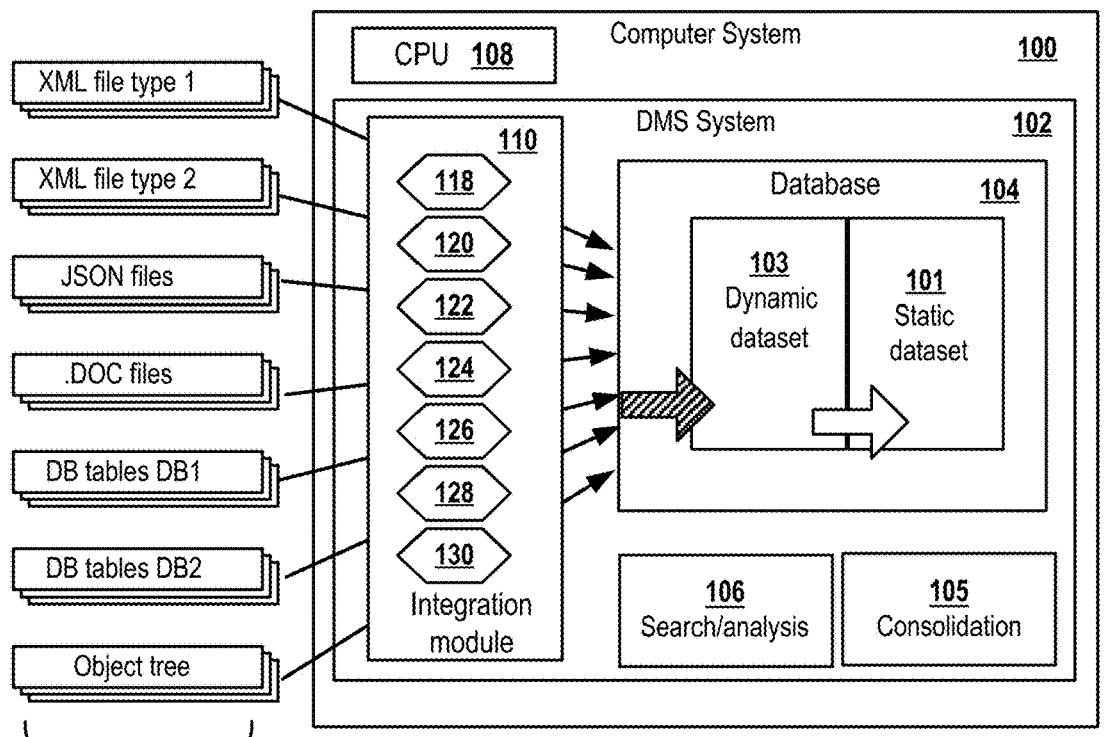
FIG. 1 shows a block diagram of a system comprising a DMS system.

FIG. 7 shows a flowchart of a method for performing a database query. The steps of the method have already been explained in conjunction with FIG. 1.

FIG. 8 shows a flowchart of a method for taking into account not-yet-consolidated data value changes in a database query.

In step 702, the DMS system receives a search query containing, for example, the search value Stefan with respect to the First name field.

In the next step 710, the DMS system searches the mapping table 210 to identify the one of the mapping IDs that is assigned to the data value or search value "Stefan". For example, this could be the numerical value "150". This mapping ID "150" is used in the following as the actual search value.

The search value "150" is used to perform a database search on the static part 101 of the database, i.e. on the field-specific data value lists. In the example described here, the search value 150 would be used to search the first name data value list and, in step i) of the search method shown in FIG. 7, a set of data record IDs would be ascertained on the static data to be returned as the result of the search of the static part. This result represents the content of the database 104 at the time of the most recent consolidation time point and thus does not include the effects that change requests obtained since that most recent consolidation time point may have on the result. In order to take into account the changes that have not yet been consolidated, the steps described in FIG. 8 are performed in addition to the steps described in FIG. 7, for example.

In step 706, data structures 216 of the dynamic part 103 of the database 104 are searched in order to ascertain data records containing a first name field that now contains or no longer contains the data value "Stefan" after a change instruction that has not yet been consolidated. In particular, these data structures 216 may be data structures containing a sorted and searchable array of data values, in particular mapping IDs. The searchable array may be, for example, a sorted list or a search tree, in particular a B-tree. An example of such a data structure is shown in FIG. 9.

Figure 9:
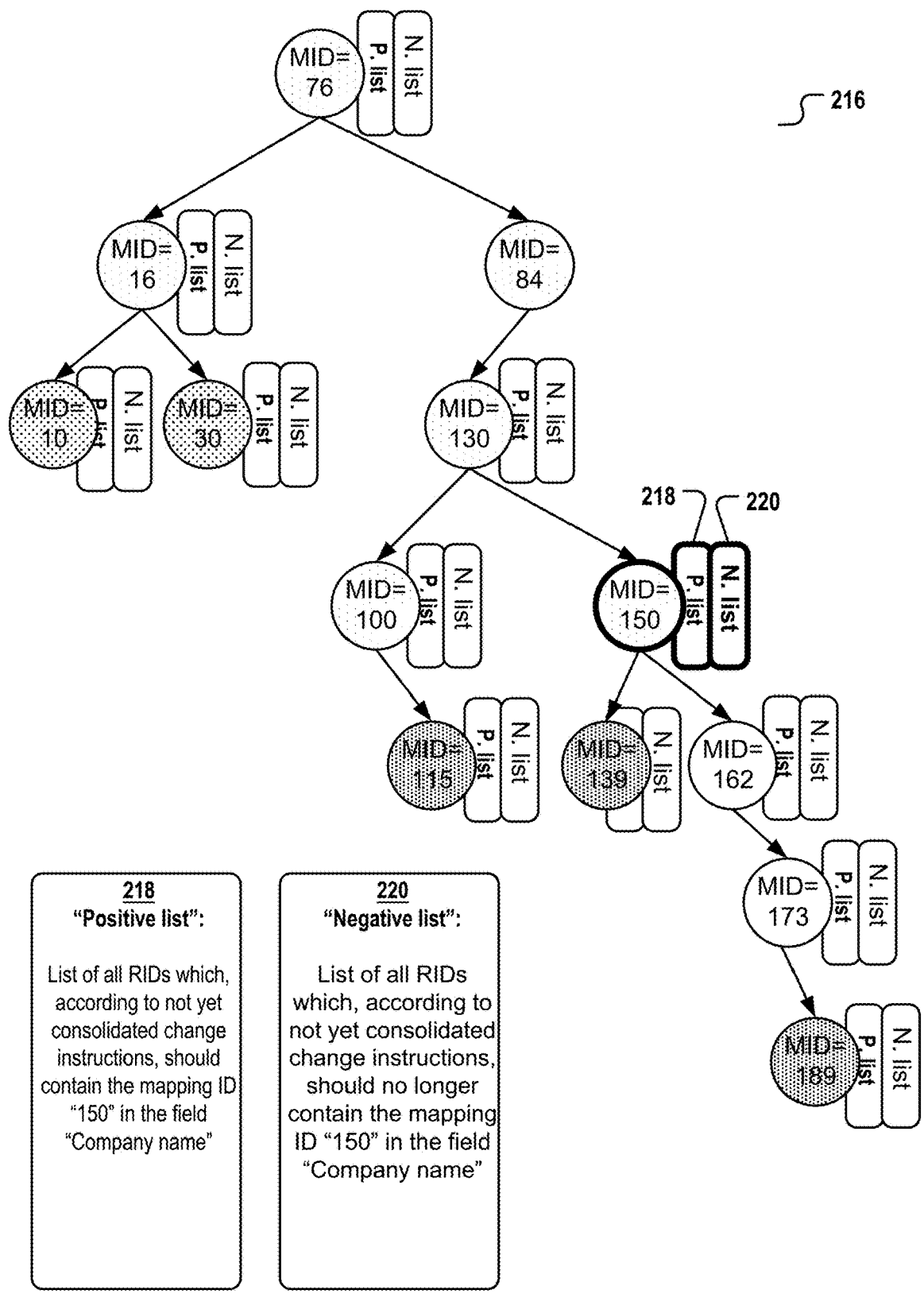
FIG. 9 shows an example of a field-specific data structure with several positive lists and negative lists.

The DMS system is configured to store change instructions relating to individual data values and/or entire data records initially in the append-only data structure and in a data structure containing positive lists and negative lists, as shown, for example, in FIG. 9. In the data structure 216, the data values assigned to a particular field to be added to or deleted from one or more data records according to one of the not yet consolidated change instructions are represented as elements of the array. Each of these data values or elements is assigned a list of data record IDs referred to as a positive list and/or a list of data record IDs referred to as a negative list. The positive list selectively contains the IDs of those data records to which the data value represented by the element of the array is to be newly added in said field. The negative list selectively contains the IDs of those data records that should no longer contain the data value represented by the element of the array in that field.

In the step 706, the data structure 216 is searched with the search value "150" until an element (for example a node of a B-tree) is found that represents this search value "150" and thus the first name "Stefan" is ascertained. In addition, a positive list and a negative list would be ascertained that are assigned to these nodes. The positive list contains the list of all data record IDs that are to contain the data value "Stefan" or "150" in the "First name" field according to a change instruction received by the DMS system after the most recent consolidation time, for example because new person data records with this first name are to be added to the database and/or because first names of existing person data records have changed, for example after a typo correction. The negative list contains the list of all data record IDs which, according to a change instruction received by the DMS system after the most recent consolidation time, should no longer contain the previous data value "Stefan", for example because this person data record is to be deleted or only the first name has changed.

In step 708, a final result list of data record IDs is calculated, which takes into account both the static part and the dynamic part of the database 104: the set of data record IDs ascertained on the static part, namely the first name data value list for the search value 150, is merged with the set of data record IDs contained in the positive list of the search value 150. This union set therefore now also contains the data record IDs which, according to the most recent and not yet consolidated change instructions, should also contain the data value 150 or Stefan in the First name field. In addition, the difference set of this union set with the set of data record IDs contained in the negative list of the search value 150 is formed. The difference set obtained in this way no longer contains the IDs of those data records that were completely deleted after the most recent consolidation time point or no longer contain the first name 150 or Stefan.

The difference set calculated in step 710 may be used as a new result of search step i) which, in contrast to step 612 in FIG. seven, also takes into account the dynamic, not yet consolidated changes. Preferably, the search now also includes the execution of steps 614, 616 and 618 analogously to the steps described with regard to FIG. seven, in order to output not only data record IDs, but complete data records with data values and optionally also superordinate and/or subordinate data records or previous data record versions.

FIG. 9 shows an example of a data structure 216 with multiple positive lists and negative lists. For example, the data structure may be a field-specific data structure and may contain, for example, only the data values (preferably in the form of mapping IDs) that are assigned to a specific field (for example, first name). However, it is also possible to implement the data structure in a way that, for example, stores the entirety of all data values in the database in a single searchable array, wherein, in this case, each element of the array is assigned one or more fields (the data value silver, for example, may represent a metal or a surname or a colour). In the implementation example described here, the data structure 216 represents only the data values or mapping IDs of the First name field.

The searchable array shown in FIG. nine is a B-tree in which the mapping IDs are stored sorted according to their numerical value. The search for the search value 150 in this tree ends at the node containing the mapping ID (MID) 150. The negative list 220 and the positive list 218 are assigned to this node.

The positive list 218 contains the IDs of all data records which are to be newly written into the database according to a change instruction received after the most recent consolidation time point and which contain the first name Stefan or mapping ID 150 in the First name field. The positive list 218 additionally contains the data record IDs of all data records that were already part of the database before the most recent consolidation time point but for which the first name is to be changed to Stefan only in accordance with a change instruction received after the most recent consolidation time point.

The negative list 220 contains the IDs of all data records which are to be deleted from the database according to a change instruction received after the most recent consolidation time point and which contained the first name Stefan or mapping ID 150 in the First name field. In addition, the negative list contains the data record IDs of all data records that were already part of the database before the most recent consolidation time point and contained the first name Stefan or the mapping ID 150 in the First name field, but which are to be changed to a value other than Stefan or 150 according to a change instruction received after the most recent consolidation time point.

Figure 10:
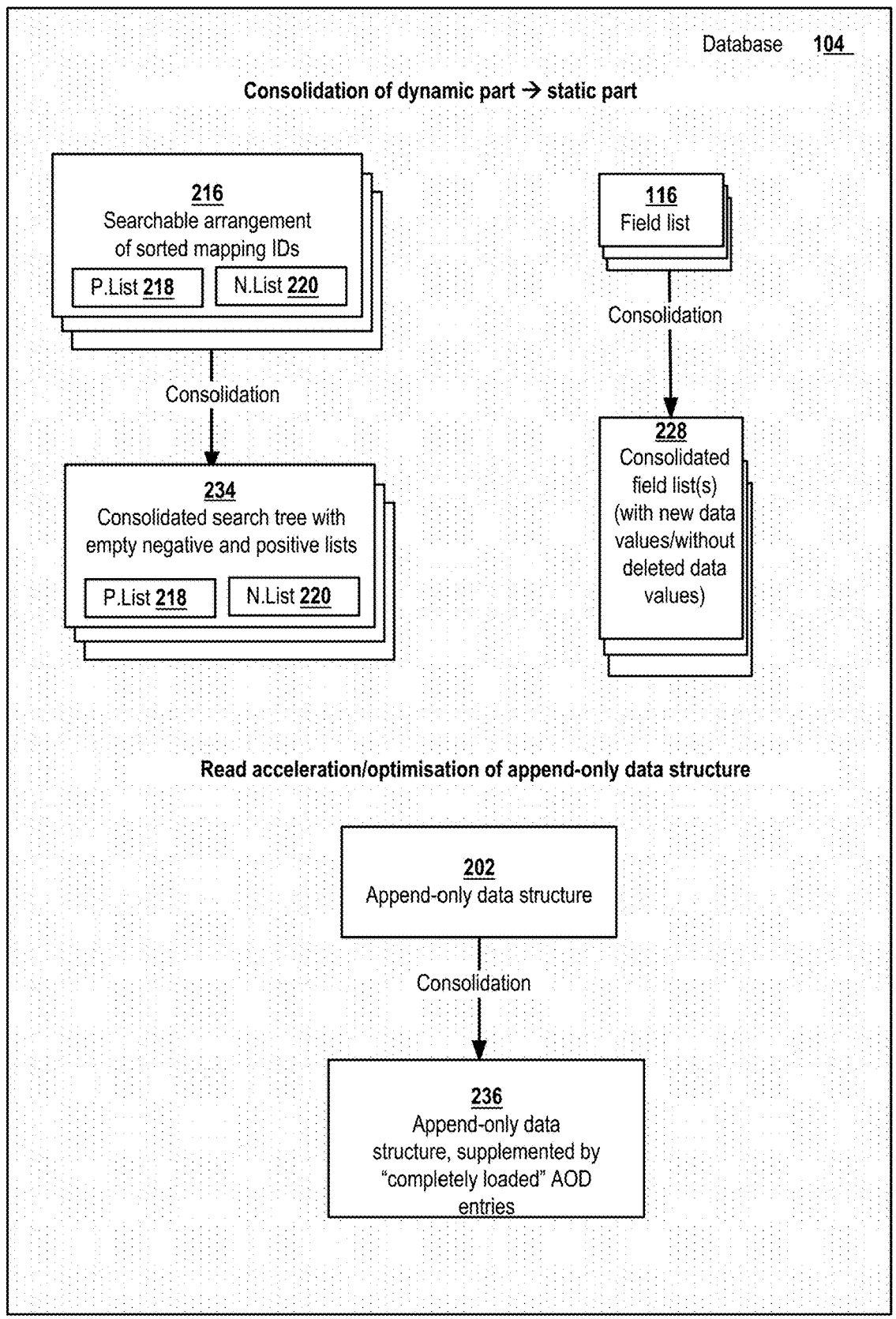
FIG. 10 shows a block diagram of data structures before and after consolidation.

FIG. 10 shows a block diagram of data structures before and after consolidation and the effect of a (consolidation-independent) optimisation of the read acceleration of the append-only file structure.

For example, in the course of consolidating a database, the content of all positive lists and negative lists may be stored in the form of changes to the field-specific data value lists. Since the positive lists and negative lists are stored linked to a field identifier and a data value (for example, a mapping ID), each data record ID stored in a negative list or positive list contains information about the way in which the already consolidated, static part of the database must be changed in order to also reflect the information contained in the positive lists and negative lists and/or in the not yet consolidated part of the append-only data structure. Consolidation of a new data record that contains only data values that are already included as data values in the corresponding field-related data value lists will not change the number of data values or mapping IDs in the field-specific data value lists (unless additional mapping IDs are generated for existing data values for the purpose of concealing frequencies of occurrence). However, the existing data values or mapping IDs are now additionally linked to the ID of the new data record. If a data record is deleted, this results in the removal of the data record ID from all field-specific data value lists that contain a data value or mapping ID contained in this data record. Even if changes are made, for example overwriting data values, in many cases only the assignment of data record IDs to the corresponding data values or mapping IDs will change. Only when a specific data value is assigned to a specific field for the first time, or when overwriting or deleting a data value of a data record that is the only data record that contained that data value, does consolidation also imply a change in the number of data values or mapping IDs contained in a field-specific data value list.

Thus, in the course of a consolidation, the field-specific data value lists 116 are converted into consolidated field-specific data value lists 228. The consolidated lists 228 contain an assignment of data values (or mapping IDs) and data record IDs reflecting all changes received from the DMS system in the form of change instructions between the most recent past consolidation time point and the time point of the current consolidation. The change instructions may be, for example, classic SQL-based DELETE, UPDATE or INSERT instructions, or other forms of write instructions in a different syntax.

In addition, the data structures with the searchable arrays (for example, lists, search trees) of data values are transferred into consolidated versions 234 of these data structures. The consolidated versions of the data structures may contain additional elements (list elements of sorted lists, nodes of search trees, etc.) that reflect newly added data values or mapping IDs that were not previously contained in the database. The consolidated versions 234 of the data structures 216 may also contain a smaller number of elements if some data values or mapping IDs have been completely deleted from the dataset. In particular, the positive lists and the negative lists of the consolidated data structure 234 are emptied. This ensures that the positive lists and negative lists contain only data record IDs relating to those data records that are to be changed according to change instructions received after the current consolidation time point.

The append-only data structure 202 is continuously updated. It is therefore typically not emptied in the course of a consolidation.

Preferably, however, the DMS system is configured to make changes to the append-only data structure 202 in the course of a consolidation or independently of a consolidation which greatly accelerate the evaluation of this data structure in the course of the execution of steps 216 and 218. This transforms the append-only data structure 202 into an optimised form 236 of the append-only data structure. The optimisation consists of the DMS system generating and storing in the append-only data structure 202 AOD entries that are referred to as "complete" or "completely loaded" AOD entries and that assign the current data value (esp. a current mapping ID) to each of the fields of a data record. These "complete" AOD entries are not written in response to the receipt of a change request, but independently thereof. For example, complete AOD entries may be generated and stored after predefined time intervals, in the course of a consolidation, in response to a command from a user or in response to a determination by the DMS system that the processing of the append-only data structure 202 in the course of performing a search query is taking too long, for example exceeds a predefined maximum value of time required.

Typically, AOD entries contain only the current data values of one or a few fields that are to be changed according to the corresponding change requests. They do not contain all data values of the changed data record. In order to ascertain all data values, the DMS system must follow the addresses contained in the respective AOD entries, each of which refers to the last-written AOD entry that refers to the same data record.

The AOD entries are generated in particular in such a way that the DMS system already ascertains the address of the already existing AOD entry with the most current/most recent change instructions during the writing of a new AOD entry for a specific data record to be changed. This ascertainment may be carried out very quickly and performantly using the address allocation table, where the data record ID is still stored linked to the address of the existing AOD entry. Then, a new AOD entry with the most recent changes of this data record is written into the append-only data structure 202, wherein this new AOD entry contains the ascertained address of the existing, most recent AOD entry. In addition, the AOD entry address assigned to the data record ID in the address allocation table must be updated so that the data record ID now points to the address of the new AOD entry.

Thus, by tracing the addresses contained in the AOD entries within the append-only data structure 202, the entire sequence of all AOD entries relating to a particular data record may be quickly searched down to the very first AOD element in the append-only data structure 202 relating to that data record.

Although this address-based jumping within the append-only data structure 202 is very efficient, the efficiency may be further increased by also writing complete AOD entries in the course of occasional optimisations, which may run synchronously or asynchronously to the other database consolidations, so that the tracing may be terminated after a few tracing steps, since all currently valid data values of a data record are known when a complete AOD entry is reached.

According to one implementation variant, the AOD data structure is optimised in the course of a consolidation or independently of a consolidation in order to accelerate the execution of steps 216 and 218. This may be done, for example, by creating a copy of the content of the AOD file, wherein the copy combines the content of several AOD entries that refer to the same data record, so that an AOD data structure is created of which the AOD entries are all complete AOD entries or which at least has a higher content of complete AOD entries than the original AOD data structure. The modified copy is then used to complete the data records to be output. When processing AOD entries to complete the result data records, fewer accesses to AOD entry addresses need to be made because a higher proportion of the AOD entries are complete AOD entries, and so there is no need to access further data records that lie in the past.

Figure 11:
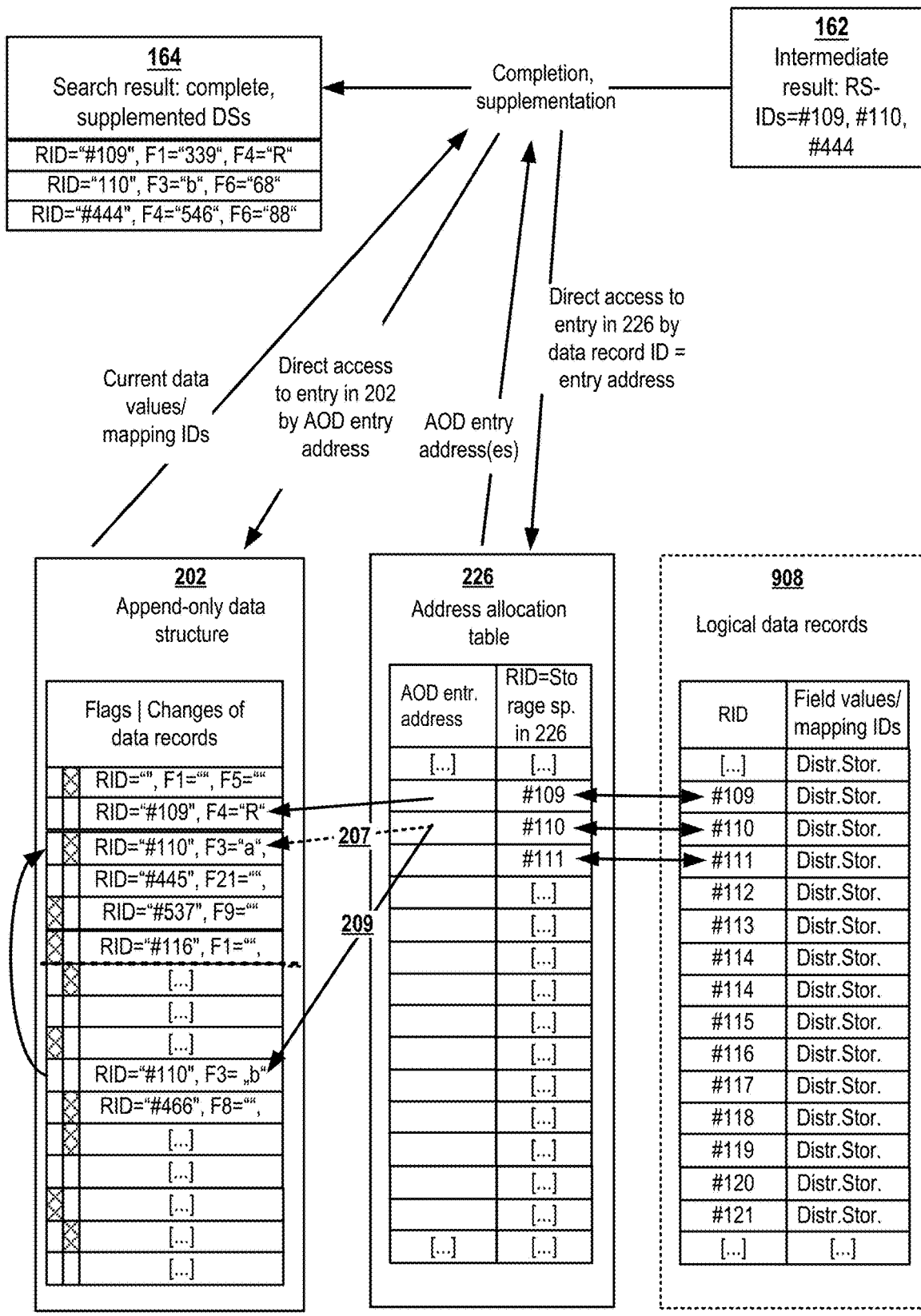
FIG. 11 shows data structures for efficient output of complete data records.

FIG. 11 shows data structures for efficient output of complete logical result data records according to another implementation example. The data structures comprise an address allocation table 226 and an append-only data structure 202, as already described for other implementation variants, for example the variant shown in FIG. 3. The logical data records 908 are shown here as a block with a dashed line to clarify that the logical data records are preferably stored in the form of non-redundant data value lists or mapping ID lists rather than in table form. The identifier "Distr.Stor." indicates that a distributed storage of the field values or mapping IDs of these data records takes place in several non-redundant data value lists.

In the implementation variant shown in FIG. 11, the DMS system is configured to also create a new entry in the address allocation table 226 uniquely assigned to this data record when creating and/or importing new logical data records, and to assign the new logical data record an ID that explicitly or implicitly specifies the memory address of the entry in the address allocation table assigned to this data record.

Thus, data record ID "#109" specifies the memory address of a row uniquely assigned to that data record within the address allocation table 226, and data record ID "#110" of another data record specifies the memory address of a row uniquely assigned to that other data record within the address allocation table 226. This is indicated by the double arrows. The entry/row in the address allocation table 226 for data record #110 contains the memory address of a specific AOD entry, namely the one with the most recent changes in the course of which the value of field F3 was set to "b". This AOD entry in turn references/contains the address of the next older AOD entry that refers to the same data record #110, which in this case specifies the earlier value of field F3, namely "a".

Preferably, a database query is executed in two steps: in a first step, only the IDs of the logical data records to be returned are ascertained, but not the field values of these data records. In the variant described here, this step may be carried out by evaluating the data value lists.

Only in the second step, starting from the IDs of the data records, are the data values (for example mapping IDs) currently assigned to the result data records ascertained using the address allocation table and the AOD data structure, and complete data records including the data values are returned. In this second step, access to the respective entries in the data structures 226 and 202 is preferably performed directly, i.e. without a search step in the respective data structures, wherein the second step comprises: a) accessing the addresses of the entries in the address allocation table explicitly or implicitly specified in the data record IDs ascertained in the first step; this step is for ascertaining the AOD addresses contained in these address allocation table entries; b) accessing the AOD entry addresses ascertained in a) in order to ascertain the most recent changes in field values of the data records to be returned; and c) if the AOD entries involved in b) are not complete, evaluating the reference to the address of a next older AOD entry contained in each AOD entry to directly access and evaluate the next older AOD entry, and repeating step c) until a current field value has been ascertained for all fields of the data records to be returned. If the field values are mapping IDs, the mapping table may be accessed in a further step to replace the mapping IDs with the original data values and return data records that contain the original data values instead of the mapping IDs.

The invention claimed is:

1. A computer-implemented method for performing a database query on a database, wherein the database contains a plurality of logical data records at a first time point, referred to as a "most recent consolidation time point", wherein each data record contains a data record identification (ID) and one or more field identifier-data value pairs, wherein the data records are physically stored in a form of field-specific data value lists, wherein the method comprises, after the most recent consolidation time point:
 receiving instructions to change data values of fields of several of the data records;
 storing the instructions in an append-only data structure without making the changes to the field-specific data value lists, wherein each entry in the append-only data structure-referred to here as an AOD entry— contains at least those of the field identifier-data value pairs of one of the data records that are to be changed according to one of the change instructions;
 for each of the data records for which the database receives one or more instructions to change data values after the most recent consolidation time point, storing the address of the most recent of the stored AOD entries specifying a change to that data record, linked to the data record ID of that data record, in an address allocation table, wherein the links in the address allocation table are automatically updated; and
 performing a database query, wherein the database query comprises:
  i. searching the field-specific data value lists to identify IDs of data records of which the content is to be returned in whole or in part based on a match with one or more field-specific search values,
  ii. accessing the address allocation table to identify addresses of AOD entries assigned to one of the data record IDs identified in i),
  iii. accessing the identified addresses of the AOD entries;, and
  iv. using the change details contained in these identified AOD entries to add field identifier-data value pairs to the data record IDs ascertained in step i) and output the data record IDs.

2. The computer-implemented method according to claim 1,
 wherein exactly one entry in the address allocation table corresponds to each of the logical data records; and/or
 wherein the method further comprises concerted management of the logical data records and the entries in the address allocation table by a data management and search (DMS) system, such that the logical data records are always generated and synchronised with the address allocation table such that the ID of each logical data record explicitly or implicitly specifies the memory address of that entry in the address allocation table in which the ID of that logical data record is assigned the address of the AOD entry with the most recent changes to that data record; and wherein in particular in step ii) the memory address specified in the data record ID is used to directly access those entries of the address allocation table which are uniquely assigned to the data records ascertained in i).

3. The computer-implemented method according to claim 1, further comprising:
 at a second time point, referred to as the "new consolidation time point", consolidating the changes instructed since the most recent consolidation time point by consolidating the field-specific data value lists independently of and/or in parallel with the execution of database queries on the field-specific data value lists; or
 at a second time point, referred to as the "new consolidation time point", consolidating the changes instructed since the most recent consolidation time point by generating consolidated copies of the field-specific data value lists independently of and/or in parallel with the execution of database queries on the field-specific data value lists.

4. The computer-implemented method according to claim 3, further comprising:
 for each data value of each of the field-specific data value lists: storing, in a list referred to as the negative list and data record IDs, the data record IDs of all logical data records that are no longer to be assigned that data value in respect of that field as a result of a change instruction received between the first and second consolidation time points;
 for each data value of each of the field-specific data value lists and for new data values for each of the fields: storing, in a list referred to as a positive list and data record IDs, the data record IDs of all logical data records that are to be assigned that data value in respect of that field as a result of a change instruction received between the first and second consolidation time points;
 wherein performing the consolidation comprises updating the data values and data record IDs of the field-specific data value lists or copies of the field-specific data value lists according to the content of the positive lists and negative lists; and
 wherein after consolidation the positive lists and negative lists are emptied.

5. The computer-implemented method according to claim 3,
 wherein the method comprises performing further database queries on the field-specific data value lists in parallel with and independently of the consolidation, without interruption; and/or
 wherein the field-specific data value lists are also free of locks on the data values contained in them during the execution of the consolidation.

6. The computer-implemented method according to claim 3, wherein performing the consolidation for each of the field-specific data value lists comprises:
 analysing field-specific and data-value-specific positive lists and negative lists of data record IDs to ascertain changes relating to the number of unique data values of a field and changes relating to the highest number of data record IDs linked to a data value of that field between the first and second consolidation time points;
 ascertaining the number of unique data values contained in a consolidated version of the field-specific data value list as a function of the change in the number of unique data values ascertained in the analysis;
 ascertaining a first memory requirement to store the highest number of data record IDs ascertained in the analysis that will be assigned to a data value in the consolidated version of the field-specific data value list and a second memory requirement to store the largest data value to be stored in the consolidated version of the field-specific data value list;

calculating the memory requirement required to store a consolidated version of the field-related data value list as a function of the ascertained number of unique data values in the list and the first and second memory requirements;

ascertaining a contiguous area on a physical data carrier that is at least as large as the calculated memory area;

generating the consolidated version of the field-related data value list integrating the changes stored in the positive lists and negative lists since the last consolidation time point; and storing the consolidated version of the field-related data value list in the ascertained contiguous area of the data carrier.

7. The computer-implemented method according to claim 1, further comprising a provision of the field-specific data value lists, wherein the provision comprises:

parsing raw data to create original data records, wherein each original data record comprises, in addition to a data record ID, one or more pairs of field identifiers and original data values assigned thereto;

storing redundancy-free field-specific original data value lists in the database, wherein each of the original data values in one of the redundancy-free field-specific original data value lists has assigned to it all the data record IDs of those original data records containing that original data value in the field representing the original data value list;

generating a mapping table that assigns to each of the original data values of the redundancy-free original data value lists at least one mapping ID that is not assigned to any other of the original data values; and transforming the original data records into the plurality of logical data records and transforming the redundancy-free field-specific original data value lists into the field-specific data value lists, wherein the transformation comprises replacing original data values with mapping IDs according to the mapping table, wherein the data values assigned to the fields of the data records are the mapping IDs.

8. The computer-implemented method according to claim 7, wherein the mapping IDs are values of which the length and/or type are preferably selected depending on the processor architecture of the computer system used for the database search, and in particular are numerical values.

9. The computer-implemented method according to claim 1, wherein at least one of the change instructions is an instruction to change or delete an obsolete data value of a field in at least one of the logical data records, wherein the method further comprises:

storing the data record ID of the at least one data record in a list of data record IDs referred to as a negative list, wherein the negative list is linked to the field identifier of the one field and is stored in a data structure linked to the data value to be changed or deleted in accordance with the change request; and wherein the execution of the database query for each of the field-specific search values comprises:

checking whether the data structure contains a negative list stored linked to a data value and a field identifier that are identical to the field-specific search value and the field identifier of the search value, if so, calculating a difference amount of all data record IDs ascertained in step i) for this field-specific search value and the data record IDs in the negative list, and using the difference amount of data record IDs for steps ii-iv.

10. The computer-implemented method according to claim 1, wherein at least one of the change instructions is an instruction to assign a new data value to a field in at least one of the data records, wherein the method further comprises:

storing the data record ID of the at least one data record in a list of data record IDs referred to as a positive list, wherein the positive list is stored in a data structure linked to the field identifier of the one field and linked to the new data value;

if the new data value replaces an obsolete data value, storing the data record ID of the at least one data record in a list of data record IDs referred to as a negative list, wherein the negative list is stored linked to the field identifier of the one field and linked to the obsolete data value; and wherein the execution of the database query for each of the field-specific search values comprises:

checking whether the data structure contains a positive list stored linked to a data value and a field identifier that are identical to the field-specific search value and the field identifier of the search value, if so, calculating a union set of all data record IDs ascertained in step i) for this field-specific search value and the data record IDs in the positive list;

wherein if the new data value replaces an obsolete data value, the data record IDs of the union set are reduced by the data record IDs in the negative list assigned to this search value and its field, and using the union set of data record IDs for steps ii-iv.

11. The computer-implemented method according to claim 7, wherein the data structure contains a searchable, sorted array of elements, wherein the array is a list of list elements or a search tree, in particular a B-tree, of nodes;

wherein the array represents one of the fields in each case;

wherein the elements of the array each represent one data value of a non-redundant list of data values contained in the data records and assigned to the field represented by the array; and wherein each of the elements of the array is stored linked to an empty or non-empty positive list and/or an empty or non-empty negative list.

12. The computer-implemented method according to claim 1, wherein the field-specific data value lists are each non-redundant data value lists selective of those data values assigned to the field representing that field-specific data value list in the logical data records;

wherein each data value in the respective field-specific data value list is unique and is stored linked to the data record IDs of all logical data records containing that data value in the field represented by the field-specific data value list; and wherein the data values are preferably stored in sorted form in the field-specific data value lists.

13. The computer-implemented method according to claim 3, wherein the consolidation comprises:

at the second time point, receiving a command to consolidate the changes instructed since the most recent consolidation time point; and in response to receiving the command:

implementing the changes in the field-specific data value lists instructed between the most recent consolidation time point and the second time point, or copies thereof, in order to generate the consolidated field-specific data value lists so that each data value in each of the consolidated field-specific data value lists is assigned only the IDs of those logical data records that contain that data value even after taking into account the changes in that field instructed between the first and second time points, using the consolidated field-specific data value lists instead of the previously used field-specific data value lists to perform database searches after the second time point, and using the second time point as the new most recent consolidation time point.

14. The computer-implemented method according to claim 1, wherein at least some of the logical data records include one or more "is-superordinate-to" fields, wherein each of the "is-superordinate-to" fields is configured to store a data record ID of a data record that is subordinate to that data record;

wherein the field-specific data value lists comprise a data value list which represents the "is-subordinate-to" field, wherein the data values stored in that data value list are IDs of logical data records subordinate to at least one other logical data record, wherein each of the data values in the "is-superordinate-to" data value list is assigned one or more IDs of the other, subordinate data records;

wherein the database query contains a completeness search parameter which specifies whether, in addition to the data records ascertained in the database query, the data records subordinate to these data records are also to be output; and wherein the execution of the database query comprises:
determining that the subordinate data records are also to be output,
searching the "is-superordinate-to" data value list with the data record IDs ascertained in step i) in order to obtain one or more IDs of data records which are subordinate to the data records ascertained in step i),
evaluating the address allocation table to identify addresses of AOD entries assigned to an ID of one of the ascertained subordinate data records, and
accessing these identified addresses of the AOD entries in order to add subordinate data records to the data records ascertained in the database query.

15. The computer-implemented method according to claim 1, wherein the field-specific data value lists comprise a plurality of field-specific data value lists, referred to as time value lists, wherein each time value list consists of a non-redundant list of time points, wherein the time points each represent a time point at which the validity of a data value of the field to which that time value list relates begins or ends in one or more of the logical data records;

wherein each of the time points in the time value list is assigned the IDs of the logical data records valid at that time point;

wherein the method comprises:
in response to receiving a change request relating to one of the logical data records, generating a new version of the data record to be changed, wherein the new version is a new logical data record containing at least one pre-version field, wherein the pre-version field contains the ID of the data record to be changed, wherein the new version, but not the data record to be changed, contains the changes specified in the change request and the time of change, and
storing the new version of the data record with the new data record ID in the field-specific data value lists and storing the start of validity of the new data record of the time value list, and the field to which said change instruction refers, wherein the ID of the new version is stored in the time value list;

wherein preferably the database query contains an indication of a field-specific validity time, wherein the validity time specifies the time point or time period at which the data record versions to be ascertained in the database query contained the at least one field-specific search value in the corresponding field; and wherein the execution of the database query comprises:
identifying the time value list that relates to the field to which the search value and the validity time relate,
searching the identified time value list with the validity time in order to identify one or more data record IDs of those data record versions stored in the time value list linked to the validity time or with a time point within the validity period,
identifying the field-specific data value list that relates to the field to which the search value and the validity time relate,
searching the identified data value list with the search value in order to identify one or more data record IDs stored in the data value list linked to the search value,
calculating the intersection set of the IDs of the versions of the data records ascertained on the basis of the identified time value list and the identified data value list,
evaluating the address allocation table to identify addresses of AOD entries assigned to an ID of one of the data record versions ascertained in the previous step, and
accessing the addresses of the AOD entries identified in the previous step in order to supplement the data record versions valid at the validity time point or during the validity time period by their field values and output them.

16. The computer-implemented method according to claim 1, wherein the AOD entries are stored as elements of a blockchain in the append-only data structure, which are chained together via a cryptographic hash value; and wherein the execution of the database search comprises a validity check of the hash values of those AOD entries that are processed in the course of the database query.

17. The computer-implemented method according to claim 1, wherein the database query is performed by a data management and search (DMS) system, which is configured to manage and persist the logical data records in the form of the field-specific data value lists, wherein the DMS system is configured not to manage and persist, in addition to the field-specific data value lists, any further data structures from which all logical data records already managed by the DMS system at the first consolidation time may be reconstructed.

18. The computer-implemented method according to claim 1, wherein the field-specific data value lists are free of locks ("database-locks") on any or all of the field-specific data value lists searched in step i) and free of locks on the data values contained therein, at least during the execution of step i).

19. A non-volatile storage medium on which computer-readable instructions are stored, which when executed by at least one processor, cause the at least one processor to execute a method for performing a database query within a database according to claim 1.

20. A computer system comprising:
   at least one processor;
   a data memory comprising a database, wherein the database contains, at a first time point, referred to as a "most recent consolidation time point", a plurality of logical data records, wherein each data record contains a data record identification (ID) and one or more field identifier-data value pairs, wherein each data record contains a data record ID and one or more field identifier-data value pairs, wherein the data records are physically stored in a form of field-specific data value lists;
   a data management and search (DMS) system, wherein the DMS system is configured to manage the database, wherein the management after the most recent consolidation time point comprises:
   receiving instructions to change data values of fields of several of the data records;
   storing the instructions in an append-only data structure without making the changes to the field-specific data value lists, wherein each entry in the append-only data structure— referred to here as an AOD entry— contains at least those of the field identifier-data value pairs of one of the data records that are to be changed according to one of the change instructions;
   for each of the data records for which the database receives one or more instructions to change data values after the most recent consolidation time point, storing the address of the most recent of the stored AOD entries specifying a change to that data record, linked to the data record ID of that data record, in an address allocation table, wherein the links in the address allocation table are automatically updated; and
   performing a database query, wherein the database query comprises:
      i. searching the field-specific data value lists to identify IDs of data records of which the content is to be returned in whole or in part based on a match with one or more field-specific search values,
      ii. evaluating the address allocation table in order to identify addresses of AOD entries assigned to one of the data record IDs identified in i),
      iii. accessing the identified addresses of the AOD entries, and
      iv. using the change details contained in these identified AOD entries to add field identifier-data value pairs to the data record IDs ascertained in step i) and output the data record IDs.

* * * * *